US010571991B2

(12) United States Patent
Sprenger et al.

(10) Patent No.: US 10,571,991 B2
(45) Date of Patent: Feb. 25, 2020

(54) METHOD AND SYSTEM FOR IMPLEMENTING AUTO-SWITCHING OR AUTO-PLAYING VIDEO CONTENT

(71) Applicant: CenturyLink Intellectual Property LLC, Denver, CO (US)

(72) Inventors: Michael D. Sprenger, Boulder, CO (US); Steven M. Casey, Littleton, CO (US); Katie S. Feiman, Englewood, CO (US); Zubin Ingah, Centennial, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 81 days.

(21) Appl. No.: 15/967,066

(22) Filed: Apr. 30, 2018

(65) Prior Publication Data

US 2019/0332162 A1     Oct. 31, 2019

(51) Int. Cl.
| | | |
|---|---|---|
| *G06F 1/3231* | (2019.01) | |
| *H04N 5/268* | (2006.01) | |
| *H04N 21/45* | (2011.01) | |
| *G06K 9/00* | (2006.01) | |

(52) U.S. Cl.
CPC ....... *G06F 1/3231* (2013.01); *G06K 9/00369* (2013.01); *H04N 5/268* (2013.01); *H04N 21/4532* (2013.01)

(58) Field of Classification Search
CPC .. G06F 1/3231; G06K 9/00369; H04N 5/268; H04N 21/4532
USPC ...................................................... 340/693.1
See application file for complete search history.

(56) References Cited

U.S. PATENT DOCUMENTS

| | | | | |
|---|---|---|---|---|
| 5,214,622 A | * | 5/1993 | Nemoto | G04G 11/00 340/12.22 |
| 6,133,909 A | * | 10/2000 | Schein | H04N 5/44543 348/E5.105 |
| 7,134,130 B1 | * | 11/2006 | Thomas | H04N 7/163 725/25 |
| 8,151,293 B1 | * | 4/2012 | Kolde | H04N 21/4263 725/32 |
| 8,681,680 B2 | | 3/2014 | Mao | |
| 8,782,122 B1 | * | 7/2014 | Chang | H04L 67/1048 709/202 |
| 8,863,179 B2 | * | 10/2014 | Sakamoto | H04N 5/44591 725/37 |
| 9,398,413 B1 | * | 7/2016 | Scalise | H04W 4/023 |
| 10,110,958 B2 | * | 10/2018 | Shovkoplias | H04N 21/44222 |
| 2004/0243257 A1 | * | 12/2004 | Theimer | H04M 1/72569 700/44 |

(Continued)

*Primary Examiner* — Nay Tun

(57) ABSTRACT

Novel tools and techniques are provided for implementing auto-switching and/or auto-playing video content. In various embodiments, a computing system might determine whether a display device that is communicatively coupled to the computing system is in an off-state, and might determine whether a first video content will begin its broadcast from a first content source within a predetermined period after initiating such determination. Based on a determination that the display device is in the off-state and based on a determination that the first video content will be broadcast within the predetermined period, the computing system might automatically switch the display device to an on-state, and might automatically set the display device to display the first video content being broadcast from the first content source.

19 Claims, 12 Drawing Sheets

(56) References Cited

U.S. PATENT DOCUMENTS

| | | | |
|---|---|---|---|
| 2005/0128296 A1* | 6/2005 | Skurdal | H04N 7/142 348/154 |
| 2005/0138659 A1* | 6/2005 | Boccon-Gibod | H04H 60/27 725/58 |
| 2005/0204388 A1* | 9/2005 | Knudson | H04N 5/44543 725/58 |
| 2006/0034583 A1 | 2/2006 | Shimizu | |
| 2007/0033607 A1* | 2/2007 | Bryan | H04H 60/27 725/10 |
| 2007/0112939 A1* | 5/2007 | Wilson | H04L 12/2807 709/219 |
| 2008/0046930 A1* | 2/2008 | Smith | H04N 7/163 725/46 |
| 2008/0239995 A1* | 10/2008 | Lee | H04L 12/1818 370/260 |
| 2009/0174821 A1* | 7/2009 | Matsuo | H04L 12/2805 348/725 |
| 2009/0322945 A1* | 12/2009 | Sakamoto | H04N 5/44591 348/564 |
| 2010/0073455 A1* | 3/2010 | Iwabuchi | H04N 7/142 348/14.04 |
| 2011/0072452 A1* | 3/2011 | Shimy | H04N 7/163 725/25 |
| 2012/0117471 A1* | 5/2012 | Amidon | H04N 5/76 715/716 |
| 2013/0117442 A1* | 5/2013 | Mountain | H04N 21/45 709/224 |
| 2014/0047467 A1* | 2/2014 | Arling | H04N 21/4143 725/14 |
| 2014/0101682 A1* | 4/2014 | Schlager | H04N 5/76 725/14 |
| 2014/0118468 A1* | 5/2014 | Purdy | H04N 7/141 348/14.08 |
| 2014/0267068 A1* | 9/2014 | Smith | H03K 17/962 345/173 |
| 2014/0368734 A1 | 12/2014 | Hoffert | |
| 2015/0095927 A1* | 4/2015 | NaikRaikar | H04N 21/44222 725/14 |
| 2015/0150045 A1* | 5/2015 | Shovkoplias | H04N 21/44222 725/34 |
| 2015/0163559 A1 | 6/2015 | Manchester | |
| 2015/0207873 A1* | 7/2015 | Chang | H04L 67/1048 709/205 |
| 2016/0360262 A1 | 12/2016 | Matejka | |
| 2017/0300001 A1* | 10/2017 | Ishikura | G03G 15/80 |
| 2018/0063567 A1* | 3/2018 | Campbell | H04M 11/04 |
| 2018/0091845 A1* | 3/2018 | Lee | H04L 12/12 |
| 2018/0091851 A1* | 3/2018 | Bae | H04N 21/42204 |

\* cited by examiner

METHOD AND SYSTEM FOR IMPLEMENTING AUTO-SWITCHING OR AUTO-PLAYING VIDEO CONTENT

CROSS-REFERENCES TO RELATED APPLICATIONS

This application may be related to one or more of the following: U.S. patent application Ser. No. 15/966,387 (the "'387 Application"), filed on Apr. 30, 2018 by Michael Sprenger et al., entitled, "System and Method for Displaying and Interacting with Notifications"; and U.S. patent application Ser. No. 15/966,908 (the "'908 Application"), filed on Apr. 30, 2018 by Michael Sprenger et al., entitled, "Method and System for Implementing Auto-Switching or Auto-Playing Video Content."

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementation media content presentation, and, more particularly, to methods, systems, and apparatuses for implementing auto-switching and/or auto-playing video content.

BACKGROUND

In conventional media content presentation systems, a user has to manually search or input search keywords to locate particular media content that is currently broadcasting or streaming or that will soon be broadcast or streamed. Once the user has found the particular media content, the user has to manually select the particular media content to play on the television.

Hence, there is a need for more robust and scalable solutions for implementation media content presentation, and, more particularly, to methods, systems, and apparatuses for implementing auto-switching and/or auto-playing video content.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
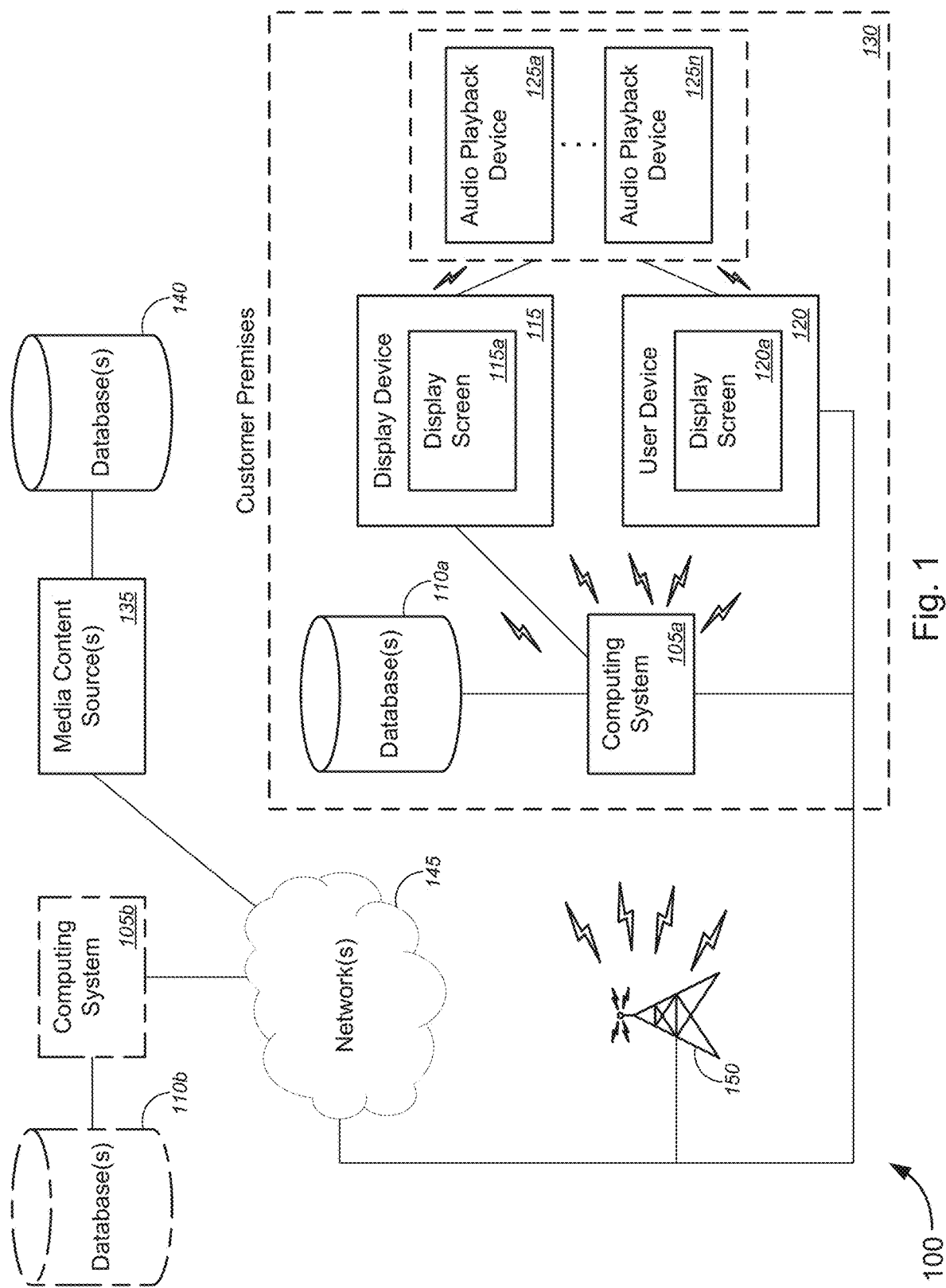
FIG. 1 is a schematic diagram illustrating a system for implementing auto-switching and/or auto-playing video content, in accordance with various embodiments.

Various embodiments provide tools and techniques for implementation media content presentation, and, more particularly, to methods, systems, and apparatuses for implementing auto-switching and/or auto-playing video content.

In various embodiments, a computing system might determine whether a display device that is communicatively coupled to the computing system is in an on-state; based on a determination that the display device is in the on-state, identify a first content source of a first video content that is displayed on a display screen of the display device; determine whether a second video content will begin its broadcast from a second content source within a predetermined period after initiating such determination; and based on a determination that the display device is in the on-state and based on a determination that the second video content will be broadcast within the predetermined period, determine whether the second content source is different from the first content source, and, based on a determination that the second content source is different from the first content source, automatically switch the display device from display of the first video content from the first content source to display of the second video content from the second content source, without user interaction from any user to initiate switching.

In some embodiments, the second video content might be displayed on a main portion of the display screen of the display device, while the first video content might be displayed in a sub-portion of the display screen. Alternatively, the first content source might be a first channel and the second content source might be a second channel, where automatically switching the display device from display of the first video content to display of the second video content might comprise automatically switching the display device from the first channel to the second channel, where the second video content might be displayed on a main portion of the display screen of the display device while the first video content might no longer be displayed.

In some cases, the predetermined period might include, but is not limited to, one of 15 minutes, 10 minutes, 5 minutes, 4 minutes, 3 minutes, 2 minutes, 1 minute, or a range of time between 1 and 15 minutes, and/or the like. In some instances, the predetermined period might be based on at least one of user profile information, user preferences, or user commands, and/or the like. According to some embodiments, each of the first video content and the second video content might include, without limitation, at least one of a movie, a television show, a documentary, a comedy, a drama, a science fiction show, a fantasy show, a non-fictional show, a sports telecast, a news show, a travel show, a home improvement show, or a cooking show, and/or the like. In some cases, the second video content might be selected based at least in part on at least one of user profile information, user preferences, prior user commands, viewer history of a user, viewer history of a friend of the user, or association with video content that the user has previously viewed, and/or the like.

According to some embodiments, the computing system might include, without limitation, one of an EPG system, a STB, a BD player, a DVR device, a processor of the display device running a software application ("app"), a processor of a user device running an app, a server computer over a network, a cloud-based computing system over a network, a media player, a streaming media player, or a gaming console, and/or the like. In some instances, the display device might include, but is not limited to, one of a television, a computer monitor, a laptop display, a tablet computer, or a smart phone, and/or the like. In some cases, the first content source and the second content source might each include, without limitation, one of a video streaming source, a video broadcast source, a BD player, a DVR device, a video-on-demand ("VOD") content source, an off the air ("OTA") source, or a third party content source, and/or the like.

In alternative embodiments, the computing system might determine whether a display device that is communicatively coupled to the computing system is in an off-state; determine whether a first video content will begin its broadcast from a first content source within a predetermined period after initiating such determination; and based on a determination that the display device is in the off-state and based on a determination that the first video content will be broadcast within the predetermined period, automatically switch the display device to an on-state, and automatically set the display device to display the first video content being broadcast from the first content source.

In some embodiments, the computing system might determine whether any users are within viewing range of the display device, where automatically switching the display device to the on-state might be based on a determination that at least one user is within viewing range of the display device. In some cases, determining whether any users are within viewing range of the display device might comprise at least one of analyzing captured images of a space within the viewing range of the display device to determine presence of users, analyzing audio of the space to identify voices of users within the viewing range of the display device, tracking proximity of user devices associated with known users, tracking location of user devices associated with known users, or tracking location of known users, and/or the like. In some instances, at least one of automatically switching the display device to the on-state or automatically setting the display device to display the first video content being broadcast from the first content source might comprise utilizing consumer electronics control ("CEC") functionality of high-definition multimedia interface ("HDMI") protocols, or the like. According to some embodiments, automatically switching the display device to the on-state and automatically setting the display device to display the first video content being broadcast from the first content source might be initiated based on at least one of vacation mode settings by a user, vacation mode instructions by the user, vacation mode profiles for the user, and/or the like.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, media content streaming or downloading technology, media content navigation or selection technology, user interface technology and/or the like. In other aspects, certain embodiments, can improve the functioning of user equipment or systems themselves (e.g., media players, set-top boxes ("STBs"), media content streaming or downloading systems, etc.), for example, by automatically switching, with the computing system, the display device from display of the first video content from the first content source to display of the second video content from the second content source, without user interaction from any user to initiate switching, based on a determination that the display device is in the on-state, based on a determination that the second video content will be broadcast within the predetermined period, and based on a determination that the second content source is different from the first content source, or by automatically switching, with the computing system, the display device to an on-state, and automatically setting, with the computing system, the display device to display the first video content being broadcast from the first content source, based on a determination that the display device is in the off-state and based on a determination that the first video content will be broadcast within the predetermined period; and/or the like. In particular, to the extent any abstract concepts are present in the various embodiments, those concepts can be implemented as described herein by devices, software, systems, and methods that involve specific novel functionality (e.g., steps or operations), such as, automatically switching, with the computing system, the display device from display of the first video content from the first content source to display of the second video content from the second content source, without user interaction from any user to initiate switching, based on a determination that the display device is in the on-state; or automatically switching, with the computing system, the display device to an on-state, and automatically setting, with the computing system, the display device to display the first video content being broadcast from the first content source; and/or the like, which optimizes presentation of the media content (particularly video content) thus providing for smoother and more efficient display of video content, and/or the like, to name a few examples, that extend beyond mere conventional computer processing operations. These functionalities can produce tangible results outside of the implementing computer system, including, merely by way of example, optimized presentation and navigation of media content (including video content) to the user thus providing for smoother and more efficient display of video content by the user, and/or the like, at least some of which may be observed or measured by customers and/or service providers.

In an aspect, a method might comprise determining, with a computing system, whether a display device that is communicatively coupled to the computing system is in an on-state; based on a determination that the display device is in the on-state, identifying, with the computing system, a first content source of a first video content that is displayed on a display screen of the display device; and determining, with the computing system, whether a second video content will begin its broadcast from a second content source within a predetermined period after initiating such determination. The method might further comprise, based on a determination that the display device is in the on-state and based on a determination that the second video content will be broadcast within the predetermined period, determining, with the computing system, whether the second content source is different from the first content source, and, based on a determination that the second content source is different from the first content source, automatically switching, with the computing system, the display device from display of the first video content from the first content source to display of the second video content from the second content source, without user interaction from any user to initiate switching.

In some embodiments, the second video content might be displayed on a main portion of the display screen of the display device, while the first video content might be displayed in a sub-portion of the display screen. Alternatively, the first content source might be a first channel and the second content source might be a second channel, where automatically switching the display device from display of the first video content to display of the second video content might comprise automatically switching the display device from the first channel to the second channel, where the second video content might be displayed on a main portion of the display screen of the display device while the first video content might no longer be displayed.

In some cases, the predetermined period might comprise one of 15 minutes, 10 minutes, 5 minutes, 4 minutes, 3 minutes, 2 minutes, 1 minute, or a range of time between 1 and 15 minutes, and/or the like. In some instances, the predetermined period might be based on at least one of user profile information, user preferences, or user commands, and/or the like. According to some embodiments, each of the first video content and the second video content might comprise at least one of a movie, a television show, a documentary, a comedy, a drama, a science fiction show, a fantasy show, a non-fictional show, a sports telecast, a news show, a travel show, a home improvement show, or a cooking show, and/or the like. In some cases, the second video content might be selected based at least in part on at least one of user profile information, user preferences, prior user commands, viewer history of a user, viewer history of a friend of the user, or association with video content that the user has previously viewed, and/or the like.

According to some embodiments, the computing system might comprise one of an EPG system, a set-top box ("STB"), a Blu-ray disc ("BD") player, a digital video recording ("DVR") device, a processor of the display device running a software application ("app"), a processor of a user device running an app, a server computer over a network, a cloud-based computing system over a network, a media player, a streaming media player, or a gaming console, and/or the like. In some instances, the display device might comprise one of a television, a computer monitor, a laptop display, a tablet computer, or a smart phone, and/or the like. In some cases, the first content source and the second content source might each comprise one of a video streaming source, a video broadcast source, a Blu-ray disc ("BD") player, a digital video recording ("DVR") device, a video-on-demand ("VOD") content source, an off the air ("OTA") source, or a third party content source, and/or the like.

In some embodiments, the method might further comprise determining, with the computing system, whether a first user who has been viewing the display device has moved beyond a viewing range of the display device at a first point during display of the second video content; based on a determination that the first user has moved beyond the viewing range of the display device, determining, with the computing system, whether the first user is within viewing range of a display screen of a user device; and based on a determination that the first user is within viewing range of a display screen of a user device, sending, with the computing system, a first command instruction to the user device to begin displaying the second video content continuing from the first point; sending, with the computing system, a second command instruction to the display device to discontinue displaying the second video content on the display screen of the display device; wherein each of the first command instruction and the second command instruction are sent by the computing system without any user interaction by any user with any of the computing system, the display device, or the user device to initiate sending of each of the first command instruction and the second command instruction.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: determine whether a display device that is communicatively coupled to the computing system is in an on-state; based on a determination that the display device is in the on-state, identify a first content source of a first video content that is displayed on a display screen of the display device; determine whether a second video content will begin its broadcast from a second content source within a predetermined period after initiating such determination; and based on a determination that the display device is in the on-state and based on a determination that the second video content will be broadcast within the predetermined period, determine whether the second content source is different from the first content source, and, based on a determination that the second content source is different from the first content source, automatically switch the display device from display of the first video content from the first content source to display of the second video content from the second content source, without user interaction from any user to initiate switching.

According to some embodiments, the second video content might be displayed on a main portion of the display screen of the display device, while the first video content might be displayed in a sub-portion of the display screen. In some cases, the first content source might be a first channel and the second content source might be a second channel, where automatically switching the display device from display of the first video content to display of the second video content might comprise automatically switching the display device from the first channel to the second channel, where the second video content might be displayed on a main portion of the display screen of the display device while the first video content might no longer be displayed.

In some embodiments, each of the first video content and the second video content might comprise at least one of a movie, a television show, a documentary, a comedy, a drama, a science fiction show, a fantasy show, a non-fictional show, a sports telecast, a news show, a travel show, a home improvement show, or a cooking show, and/or the like. In some cases, the second video content might be selected based on at least one of user profile information, user preferences, prior user commands, viewer history of a user, viewer history of a friend of the user, or association with video content that the user has previously viewed, and/or the like. According to some embodiments, the apparatus might comprise one of an EPG system, a set-top box ("STB"), a Blu-ray disc ("BD") player, a digital video recording ("DVR") device, a processor of the display device running a software application ("app"), a processor of a user device running an app, a server computer over a network, a cloud-based computing system over a network, a media player, a streaming media player, or a gaming console, and/or the like. In some instances, the display device might comprise one of a television, a computer monitor, a laptop display, a tablet computer, or a smart phone, and/or the like. In some cases, the first content source and the second content source might each comprise one of a video streaming source, a video broadcast source, a Blu-ray disc ("BD") player, a digital video recording ("DVR") device, a video-on-demand ("VOD") content source, an off the air ("OTA") source, or a third party content source, and/or the like.

In yet another aspect, a system might comprise a computing system and a display device. The computing system might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: determine whether a display device that is communicatively coupled to the computing system is in an on-state; based on a determination that the display device is in the on-state, identify a first content source of a first video content that is displayed on a display screen of the display device; determine whether a second video content will begin its broadcast from a second content source within a predetermined period after initiating such determination; and based on a determination that the display device is in the on-state and based on a determination that the second video content will be broadcast within the predetermined period, determine whether the second content source is different from the first content source, and, based on a determination that the second content source is different from the first content source, automatically switch the display device from display of the first video content from the first content source to display of the second video content from the second content source, by sending command instructions to the display device to switch from display of the first video content to display of the second video content, without user interaction from any user to initiate switching.

The display device might comprise the display screen; at least one second processor; and a second non-transitory computer readable medium communicatively coupled to the at least one second processor. The second non-transitory computer readable medium might have stored thereon computer software comprising a second set of instructions that, when executed by the at least one second processor, causes the display device to: receive the command instructions from the computing system to switch from display of the first video content to display of the second video content; and switch from display of the first video content to display of the second video content, on the display screen.

In an aspect, a method might comprise determining, with a computing system, whether a display device that is communicatively coupled to the computing system is in an off-state; determining, with the computing system, whether a first video content will begin its broadcast from a first content source within a predetermined period after initiating such determination; and based on a determination that the display device is in the off-state and based on a determination that the first video content will be broadcast within the predetermined period, automatically switching, with the computing system, the display device to an on-state, and automatically setting, with the computing system, the display device to display the first video content being broadcast from the first content source.

In some embodiments, the method might further comprise determining, with the computing system, whether any users are within viewing range of the display device; wherein automatically switching the display device to the on-state is based on a determination that at least one user is within viewing range of the display device. In some cases, determining whether any users are within viewing range of the display device might comprise at least one of analyzing captured images of a space within the viewing range of the display device to determine presence of users, analyzing audio of the space to identify voices of users within the viewing range of the display device, tracking proximity of user devices associated with known users, tracking location of user devices associated with known users, or tracking location of known users, and/or the like.

According to some embodiments, at least one of automatically switching the display device to the on-state or automatically setting the display device to display the first video content being broadcast from the first content source might comprise utilizing consumer electronics control ("CEC") functionality of high-definition multimedia interface ("HDMI") protocols, or the like. In some instances, automatically switching the display device to the on-state and automatically setting the display device to display the first video content being broadcast from the first content source might be initiated based on at least one of vacation mode settings by a user, vacation mode instructions by the user, vacation mode profiles for the user, and/or the like.

In some embodiments, the method might further comprise determining, with the computing system, whether a first user who has been viewing the display device has moved beyond a viewing range of the display device at a first point during display of the first video content; based on a determination that the first user has moved beyond the viewing range of the display device, determining, with the computing system, whether the first user is within viewing range of a display screen of a user device; and based on a determination that the first user is within viewing range of a display screen of a user device, sending, with the computing system, a first command instruction to the user device to begin displaying the first video content continuing from the first point; sending, with the computing system, a second command instruction to the display device to discontinue displaying the first video content on the display screen of the display device; wherein each of the first command instruction and the second command instruction are sent by the computing system without any user interaction by any user with any of the computing system, the display device, or the user device to initiate sending of each of the first command instruction and the second command instruction.

According to some embodiments, the method might further comprise sending, with the computing system, a notification to a user to provide the user with one or more options, the one or more options comprising at least one of an option to manually turn on the display device, an option to record the first video content, an option for the user to view the first video content on a user device, or an option to turn on a device connected to the display device and begin displaying the first video content on the device, and/or the like.

In some cases, the predetermined period might comprise one of 15 minutes, 10 minutes, 5 minutes, 4 minutes, 3 minutes, 2 minutes, 1 minute, or a range of time between 1 and 15 minutes, and/or the like. In some instances, the predetermined period might be based on at least one of user profile information, user preferences, or user commands, and/or the like. According to some embodiments, the first video content might comprise at least one of a movie, a television show, a documentary, a comedy, a drama, a science fiction show, a fantasy show, a non-fictional show, a sports telecast, a news show, a travel show, a home improvement show, or a cooking show, and/or the like. In some cases, the first video content might be selected based at least in part on at least one of user profile information, user preferences, prior user commands, viewer history of a user, viewer history of a friend of the user, association with video content that the user has previously viewed, viewing preferences of pets, viewing history of pets, or viewing profile of pets, and/or the like.

According to some embodiments, the computing system might comprise one of an EPG system, a set-top box ("STB"), a Blu-ray disc ("BD") player, a digital video recording ("DVR") device, a processor of the display device running a software application ("app"), a processor of a user device running an app, a server computer over a network, a cloud-based computing system over a network, a media player, a streaming media player, or a gaming console, and/or the like. In some instances, the display device might comprise one of a television, a computer monitor, a laptop display, a tablet computer, or a smart phone, and/or the like. In some cases, the first content source might comprise one of a video streaming source, a video broadcast source, a Blu-ray disc ("BD") player, a digital video recording ("DVR") device, a video-on-demand ("VOD") content source, an off the air ("OTA") source, or a third party content source, and/or the like.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: determine whether a display device that is communicatively coupled to the computing system is in an off-state; determine whether a first video content will begin its broadcast from a first content source within a predetermined period after initiating such determination; and based on a determination that the display device is in the off-state and based on a determination that the first video content will be broadcast within the predetermined period, automatically switch the display device to an on-state, and automatically set the display device to display the first video content being broadcast from the first content source.

According to some embodiments, each of the first video content might comprise at least one of a movie, a television show, a documentary, a comedy, a drama, a science fiction show, a fantasy show, a non-fictional show, a sports telecast, a news show, a travel show, a home improvement show, or a cooking show, and/or the like. In some cases, the first video content might be selected based at least in part on at least one of user profile information, user preferences, prior user commands, viewer history of a user, viewer history of a friend of the user, association with video content that the user has previously viewed, viewing preferences of pets, viewing history of pets, or viewing profile of pets, and/or the like. In some instances, the apparatus might comprise one of an EPG system, a set-top box ("STB"), a Blu-ray disc ("BD") player, a digital video recording ("DVR") device, a processor of the display device running a software application ("app"), a processor of a user device running an app, a server computer over a network, a cloud-based computing system over a network, a media player, a streaming media player, or a gaming console, and/or the like. In some cases, the display device might comprise one of a television, a computer monitor, a laptop display, a tablet computer, or a smart phone, and/or the like.

In yet another aspect, a system might comprise a computing system and a display device. The computing system might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: determine whether a display device that is communicatively coupled to the computing system is in an off-state; determine whether a first video content will begin its broadcast from a first content source within a predetermined period after initiating such determination; and based on a determination that the display device is in the off-state and based on a determination that the first video content will be broadcast within the predetermined period, automatically switch the display device to an on-state, and automatically set the display device to display the first video content being broadcast from the first content source, by sending command instructions to the display device to switch the display device to an on-state and to set the display device to display the first video content, without user interaction from any user to initiate switching.

The display device might comprise a display screen; at least one second processor; and a second non-transitory computer readable medium communicatively coupled to the at least one second processor. The second non-transitory computer readable medium might have stored thereon computer software comprising a second set of instructions that, when executed by the at least one second processor, causes the display device to: receive the command instructions from the computing system to switch the display device to an on-state and to set the display device to display the first video content; power on the display device; and display the first video content on the display screen.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-8 illustrate some of the features of the method, system, and apparatus for implementation media content presentation, and, more particularly, to methods, systems, and apparatuses for implementing auto-switching and/or auto-playing video content, as referred to above. The methods, systems, and apparatuses illustrated by FIGS. 1-8 refer to examples of different embodiments that include various components and steps, which can be considered alternatives or which can be used in conjunction with one another in the various embodiments. The description of the illustrated methods, systems, and apparatuses shown in FIGS. 1-8 is provided for purposes of illustration and should not be considered to limit the scope of the different embodiments.

With reference to the figures, FIG. 1 is a schematic diagram illustrating a system 100 for implementing auto-switching and/or auto-playing video content, in accordance with various embodiments.

In the non-limiting embodiment of FIG. 1, system 100 might comprise a computing system 105a and a data store or database 110a that is local to the computing system 105a. In some cases, the database 110a might be external, yet communicatively coupled, to the computing system 105a. In other cases, the database 110a might be integrated within the computing system 105a. System 100, according to some embodiments, might further comprise one or more display devices 115 (collectively, "display devices 115" or the like), which might each include a display screen 115a, and one or more user devices 120 (collectively, "user devices 120" or the like), which might each include at least one of a display screen, a touchscreen display, or touchscreen display device 120a, and/or the like. In some cases, system 100 might further, or optionally, comprise one or more audio playback devices 125a-125n (collectively, "audio playback devices 125" or "speakers 125" or the like), and/or the like. Each of the one or more display devices 115 and/or the one or more user devices 120 might communicatively couple to the computing system 105a, and/or to each other, either via wireless connection and/or via wired connection. The one or more user devices 120 might each receive user input from a user (in various embodiments, receiving touch input from the user via the touchscreen display 120a), and might each relay the user input to the computing system 105a, according to some embodiments. In some cases, the user devices 120 might include, without limitation, at least one of a dedicated remote control device (with touchscreen display) that is associated with the computing system 105a, a universal remote control device (with touchscreen display) that has been paired, synced, or synchronized with the computing system 105a, a tablet computer that has been paired, synced, or synchronized with the computing system 105a, a smart phone that has been paired, synced, or synchronized with the computing system 105a, or other portable device (with touchscreen display) that has been paired, synced, or synchronized with the computing system 105a, and/or the like. In some cases, the computing system 105a, the database 110a, the one or more display devices 115 (including the display screen(s) 115a and/or the audio playback device(s) 125, etc.), and the user device(s) 120 may be disposed within a customer premises 130, which might be one of a single family house, a multi-dwelling unit ("MDU") within a multi-dwelling complex (including, but not limited to, an apartment building, an apartment complex, a condominium complex, a townhouse complex, a mixed-use building, etc.), a motel, an inn, a hotel, an office building or complex, a commercial building or complex, an industrial building or complex, and/or the like.

In some embodiments, the computing system 105a might comprise one of a processor on the display device running a software application ("app"), a processor on the user device running an app, a media player, and/or the like. In some cases, the media device might include, but is not limited to, one of an electronic programming guide ("EPG") system, a set-top box ("STB"), a media player, a gaming console, a server computer, a desktop computer, or a laptop computer, and/or the like. The media player might include, without limitation, one of a digital versatile disc or digital video disc ("DVD") player, a Blu-ray disc ("BD") player, a digital video recording ("DVR") device, a streaming video player, a streaming music player, or a streaming game player, and/or the like, while the one or more display devices 115 might include, but are not limited to, at least one of one or more monitors (e.g., computer monitor or laptop monitor, or the like), one or more television sets (e.g., smart television sets or other television sets, or the like), and/or the like. In some cases, the user device 120 might include, without limitation, one of a laptop computer, a tablet computer, a smart phone, a mobile phone, a personal digital assistant, a remote control device, or a portable gaming device, and/or the like.

System 100 might further comprise one or more media content sources or servers 135 and corresponding databases 140 that might communicatively couple to the computing system 105a via one or more networks 145 (and in some cases, via one or more telecommunications relay systems 150, which might include, without limitation, one or more wireless network interfaces (e.g., wireless modems, wireless access points, and the like), one or more towers, one or more satellites, and/or the like). The lightning bolt symbols are used to denote wireless communications between the one or more telecommunications relay systems 150 and the computing system 105a, between the one or more telecommunications relay systems 150 and each of at least one of the user devices 120, between the computing system 105a and each of at least one of the display devices 115, between the computing system 105a and each of at least one of the user devices 120, between the computing system 105a and each of the one or more audio playback devices 125a-125n, between the display device 115 and each of at least one of the one or more audio playback devices 125a-125n, between the user devices 120 and each of at least one of the one or more audio playback devices 125a-125n, and/or the like. According to some embodiments, alternative or additional to the computing system 105a and corresponding database 110a being disposed within customer premises 130, system 100 might comprise remote computing system 105b and corresponding database(s) 110b that communicatively couple with the one or more display devices 115 and/or with the one or more user devices 120 in the customer premises via the one or more networks 145 (and in some cases, via the one or more telecommunications relay systems 150). According to some embodiments, remote computing system 105b might comprise at least one of a server computer over a network, a cloud-based computing system over a network, and/or the like.

In operation, the computing system 105a or 105b (collectively, "computing system 105" or the like) might determine whether a display device 115 that is communicatively coupled to the computing system 105 is in an on-state; based on a determination that the display device 115 is in the on-state, identify a first content source (e.g., one of media content sources 135) of a first video content that is displayed on a display screen of the display device; determine whether a second video content will begin its broadcast from a second content source (e.g., the same media content source 135 as the first content source or another one of media content sources 135) within a predetermined period after initiating such determination; and based on a determination that the display device 115 is in the on-state and based on a determination that the second video content will be broadcast within the predetermined period, determine whether the second content source is different from the first content source, and, based on a determination that the second content source is different from the first content source, automatically switch the display device 115 from display of the first video content from the first content source to display of the second video content from the second content source, without user interaction from any user to initiate switching.

In some embodiments, the second video content might be displayed on a main portion of the display screen 115a of the display device 115, while the first video content might be displayed in a sub-portion of the display screen 115a. Alternatively, the first content source 135 might be a first channel and the second content source might be a second channel, where automatically switching the display device 115 from display of the first video content to display of the second video content might comprise automatically switching the display device 115 from the first channel to the second channel, where the second video content might be displayed on a main portion of the display screen 115a of the display device 115 while the first video content might no longer be displayed.

In some cases, the predetermined period might include, but is not limited to, one of 15 minutes, 10 minutes, 5 minutes, 4 minutes, 3 minutes, 2 minutes, 1 minute, or a range of time between 1 and 15 minutes, and/or the like. In some instances, the predetermined period might be based on at least one of user profile information, user preferences, or user commands, and/or the like. According to some embodiments, each of the first video content and the second video content might include, without limitation, at least one of a movie, a television show, a documentary, a comedy, a drama, a science fiction show, a fantasy show, a non-fictional show, a sports telecast, a news show, a travel show, a home improvement show, or a cooking show, and/or the like. In some cases, the second video content might be selected based at least in part on at least one of user profile information, user preferences, prior user commands, viewer history of a user, viewer history of a friend of the user, or association with video content that the user has previously viewed, and/or the like.

According to some embodiments, the computing system 105 might include, without limitation, one of an EPG system, a STB, a BD player, a DVR device, a processor of the display device running a software application ("app"), a processor of a user device running an app, a server computer over a network, a cloud-based computing system over a network, a media player, a streaming media player, or a gaming console, and/or the like. In some instances, the display device 115 might include, but is not limited to, one of a television, a computer monitor, a laptop display, a tablet computer, or a smart phone, and/or the like. In some cases, the first content source and the second content source might each include, without limitation, one of a video streaming source, a video broadcast source, a BD player, a DVR device, a video-on-demand ("VOD") content source, an off the air ("OTA") source, or a third party content source, and/or the like.

In alternative embodiments, the computing system 105 might determine whether a display device 115 that is communicatively coupled to the computing system 105 is in an off-state; determine whether a first video content will begin its broadcast from a first content source within a predetermined period after initiating such determination; and based on a determination that the display device 115 is in the off-state and based on a determination that the first video content will be broadcast within the predetermined period, automatically switch the display device 115 to an on-state, and automatically set the display device 115 to display the first video content being broadcast from the first content source.

In some embodiments, the computing system 105 might determine whether any users are within viewing range of the display device 115, where automatically switching the display device 115 to the on-state might be based on a determination that at least one user is within viewing range of the display device 115. In some cases, determining whether any users are within viewing range of the display device 115 might comprise at least one of analyzing captured images of a space within the viewing range of the display device 115 to determine presence of users, analyzing audio of the space to identify voices of users within the viewing range of the display device 115, tracking proximity of user devices 120 associated with known users, tracking location of user devices 120 associated with known users, or tracking location of known users, and/or the like. In some instances, at least one of automatically switching the display device 115 to the on-state or automatically setting the display device 115 to display the first video content being broadcast from the first content source might comprise utilizing consumer electronics control ("CEC") functionality of high-definition multimedia interface ("HDMI") protocols, or the like. According to some embodiments, automatically switching the display device 115 to the on-state and automatically setting the display device 115 to display the first video content being broadcast from the first content source might be initiated based on at least one of vacation mode settings by a user, vacation mode instructions by the user, vacation mode profiles for the user, and/or the like.

In some instances, the computing system 105 might send a notification to a user to provide the user with one or more options, the one or more options including, but not limited to, at least one of an option to manually turn on the display device 115, an option to record the first video content, an option for the user to view the first video content on a user device 120, or an option to turn on a device connected to the display device 115 and begin displaying the first video content on the device, and/or the like.

In some aspects, the system might automatically switch channels when a television show starts (or begins broadcast), in some cases, based at least in part on at least one of frequently watched shows by the user, shows watched by friends of the user, a determination that the television show is a new show in a television series, a determination that a sporting event is now being broadcast live, and/or the like. In some cases, the sporting event may be determined based on a favorite sport(s) of the user, a favorite sport team(s), and/or the like. Based on a determination that a sport or show is currently being broadcast on a different channel, automatically switches to that channel. In an example, a user might be watching golf on one channel, but a Denver Broncos game is starting and is being broadcast on a different channel, so system changes channels to display the Broncos game.

According to some embodiments, the user may turn the auto-switching feature off or on, and may customize based on the show. In some cases, the feature may be turned off or on based on determination that friends are watching shows, and/or the like. In some embodiments, auto-switching channels or media sources may be accompanied by previewing notifications. In some cases, a channel may automatically switch to a new channel, but may leave currently viewed channel in a thumbnail or the like. Based on user selection of the main channel in the thumbnail, the channel may be returned to currently viewed content.

According to some embodiments, automatically playing or displaying content may utilize habits of the user to determine what to play or display next (e.g., automatically switching the channel or playing content from DVR or play VOD content or play cloud content, etc.). In some cases, the system might automatically switch to displaying the next show or event based on a determination that the current show has ended (and the next show or event is a favorite or is based on favorites of the user, or has been preselected or prescheduled, etc.). In some instances, the system might automatically play or display recorded content during commercials or advertisements of broadcast content. In an example, the system might detect the start of a commercial(s) or advertisement(s), might switch from display of broadcast media content to play the recorded content, might detect the end of the commercial(s) or advertisement(s), and might return to display of the broadcast media content.

In some embodiments, based on a determination that the user or a user device associated with the user is out of the room or leaving the room, or when the user is not in the same room as a television, the system might broadcast or send the media content to the user's portable device (e.g., smart phone, tablet, etc.) so the user can continue watching the media content in a different room (e.g., in the kitchen or a different room, etc.), while either sending instructions to the television to pause display of the media content or to turn off the display of the media content, without any user interaction by any user with any of the computing system, the television, and/or the portable device, and/or the like, and, in some cases, without the portable device receiving instructions or the video signal directly from or to the television. When the user moves back to the television room, the system might send instructions to the television to display the media content, while sending instructions to the portable device to stop display of the media content on the portable device, without any user interaction by any user with any of the computing system, the television, and/or the portable device, and/or the like, and, in some cases, without the portable device receiving instructions or the video signal directly to or from the television. In some instances, a software application on the portable device may be used to coordinate timing with the system and the television to take into account delays in sending signals and in the television (or the portable device) picking up the media content from the media source, etc.

According to some embodiments, the system might support auto-play functionality on a mobile device(s). In some cases, the auto-play feature might be supported on mobile and/or phone apps. In some embodiments, the auto-play functionality might be based on user profile. In some instances, the auto-play feature might be set-up to work based on the user's user profile so that the user can turn the feature on or off. In some cases, the auto-play preferences might be set-up based on the user's recommended content (in some cases, from a recommendation engine, or the like).

In alternative aspects, the system might determine favorite shows of a user, in some cases, based at least in part on at least one of user habits, user selected favorites, etc. In some instances, a set-top-box ("STB") and/or the computing system may also determine searches that the user has made about one or more of sports, sports teams, current events, shows, and/or the like, and might turn the TV/phone to the on-state in response to a determination that content associated with the event is currently being displayed or starting soon (e.g., in the next 15 minutes, 10 minutes, 5 minutes, 4 minutes, 3 minutes, 2 minutes, or 1 minute, and/or the like). In some cases, the STB and/or the computing system might also determine whether alerts and/or emergency notifications affect a user and/or user location and might turn on the TV/phone automatically.

In some embodiments, the system might determine whether the television (or display device) is in the off-state. Based on a determination that a television show or media content is starting now (or starting soon) and based on a determination that the television (or display device) is in the off-state, the system might automatically turn the television (or display device) to the on-state and might tune the television (or display device) to the channel over which the television show or media content is (or is going to be broadcast) or might switch the source inputs of the television (or display device) to the media source from which the television show or media content will be sent. In some cases the system might utilize (where available) the consumer electronics control ("CEC") functionality of high-definition multimedia interface ("HDMI") protocols to turn the television (or display device) on or off. If the television (or display device) is in the off-state, a notification might be sent to a user's personal device (e.g., tablet, smart phone, mobile phone, smart watch, computer, or other television, etc.) indicating that media content (e.g., a television show that the user is determined to like, or the like) is about to start. In some cases, the notification may give the user options to turn the television on, to record the media content, to start watching the media content on personal device, to turn on the television connected to the personal device and start playing the media content, and/or the like.

According to some embodiments, a television may only turn on if a user is in the same room as the television. Based on a determination that the user is not in the room, a DVR may automatically record the television show or media content. In some cases, the television show or media content may automatically be sent to a device associated with the user and may begin being displayed on the device. In some embodiments, the system might determine that a person is in the room based at least in part on at least one of analysis of images captured by a camera(s) located in a STB or the like, determination of location of personal device associated with the person (in some cases, determining if there is a Bluetooth connection, or the like), analysis by a device capable of determining user presence, and/or the like.

In some embodiments, if the television show or media content is displayed on a personal device associated with the user (e.g., phone, tablet, or the like), a computing system or STB may detect when the personal device is near the television or STB. In some cases, the personal device or STB may share information regarding the television show or media content (including, but not limited to, title, channel, time, etc.). In some instances, the personal device may communicate with a computing system to send a television show or media content to the STB or television. In some examples, the personal device might turn off or stop displaying the television show or media content, while the STB might display the television show or media content on the television as personal device stops displaying the television show or media content. For the auto-switching functionality, the STB and personal device may share information including, but not limited to, startup, switchover time, etc., to ensure seamless transition between the STB and the personal device. In some cases, an app on the personal device may be used to communicate with the computing system to display the STB or television. In some instances, when the personal device leaves the room, and no other devices or users are detected, the television may turn off.

According to some embodiments, the user may opt into auto-play and/or auto-switch mode. In some cases, such option-selection may be based on time of day or time of week, etc., or may be based on when the users are determined to be typically at home. In some instances, the system might include a sleep mode for auto-play. In some examples, power sleep levels may be time-dependent. In some cases, the system might be set for energy saving mode when users are not typically home, in some cases, based on user specifications or detected habits of the user. In some instances, there may be less energy saving when users are home and auto-play mode is selected by the user.

In some embodiments, the system might include a security mode, which might set-up the television to turn on or off—in some cases, at random times of the day and/or randomly changing channels, or the like—while the user is away (e.g., on vacation or the like) to give the illusion that people are home and using the television. In other words, the system might allow the user to set-up a vacation mode on the entertainment system that runs while the user is away, in some cases, via an app on the user's personal device, or the like. According to some embodiments, the system might provide a pet entertainment mode for the user's pets (e.g., dogs, puppies, cats, kittens, bird, hamster, or other animals). In such embodiments, the system might allow a user to set-up profiles for daily television shows or media content for the user's pets. In some cases, a pet profile may allow a user to select the type of pet (e.g., cat, dog, bird, hamster, etc.) and then pick the programming that the user's pet likes to watch. The user may set-up time-based playback for the user's pets with pet-based programs.

According to some embodiments, the system might provide voice-activated functionalities. For example, the user might say, "Alexa, play my shows." The system might determine by voice print that it is Dad and he wants to watch his daily shows.

Figure 2A:
FIGS. 2A-2C are schematic diagrams illustrating various embodiments of a display device that may be used for implementing auto-switching video content.
Figure 2B:
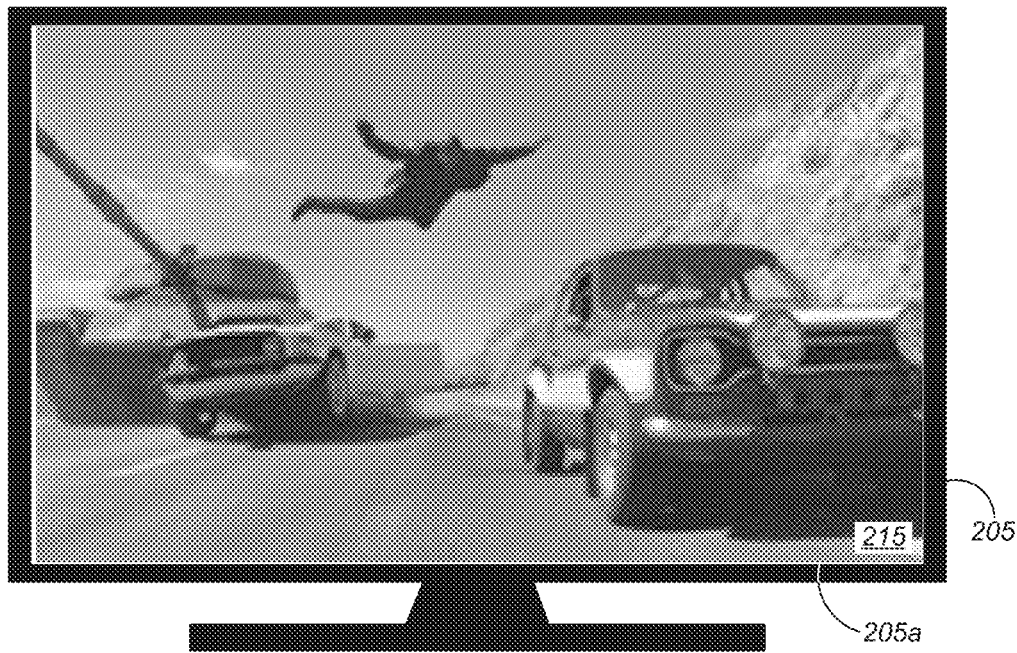
Figure 2C:

FIGS. 2A-2C (collectively, "FIG. 2") are schematic diagrams illustrating an embodiment 200 of a display device that may be used for implementing auto-switching video content.

In the non-limiting embodiment 200 of FIG. 2, display device 205 might comprise display screen 205a, or the like. In a first instance, as shown in FIG. 2A, a first video content 210 might be displayed on the display screen 205a. Based on a determination that the display device is in the on-state, a computing system (e.g., computing system 105 of FIG. 1, or the like) might identify a first content source of the first video content 210 that is displayed on a display screen 205a of the display device 205. The computing system might determine whether a second video content 215 will begin its broadcast from a second content source within a predetermined period after initiating such determination (i.e., determining whether the second video content 215 will soon begin its broadcast). Based on a determination that the display device 205 is in the on-state and based on a determination that the second video content 215 will be broadcast within the predetermined period, the computing system might determine whether the second content source is different from the first content source, and, based on a determination that the second content source is different from the first content source, might automatically switch the display device from display of the first video content from the first content source to display of the second video content from the second content source, without user interaction from any user to initiate switching. FIG. 2B depicts a second instance in which the display device has been automatically switched to display of the second video content 215.

In some cases, the predetermined period might include, without limitation, one of 15 minutes, 10 minutes, 5 minutes, 4 minutes, 3 minutes, 2 minutes, 1 minute, or a range of time between 1 and 15 minutes, and/or the like. In some instances, the predetermined period might be based on at least one of user profile information, user preferences, or user commands, and/or the like. In some embodiments, each of the first video content and the second video content might include, but is not limited to, at least one of a movie, a television show, a documentary, a comedy, a drama, a science fiction show, a fantasy show, a non-fictional show, a sports telecast, a news show, a travel show, a home improvement show, or a cooking show, and/or the like. In some instances, the second video content might be selected based at least in part on at least one of user profile information, user preferences, prior user commands, viewer history of a user, viewer history of a friend of the user, or association with video content that the user has previously viewed, and/or the like. In some cases, the display device 205 might include, without limitation, one of a television, a computer monitor, a laptop display, a tablet computer, or a smart phone, and/or the like.

Referring to FIG. 2C, according to some embodiments, the second video content 215 might be displayed on a main portion of the display screen 205a of the display device 205, while the first video content 210 might be displayed in a sub-portion 205b of the display screen 205. Alternatively, as shown in FIG. 2B, in some embodiments, the first content source might be a first channel and the second content source might be a second channel, where automatically switching the display device from display of the first video content to display of the second video content comprises automatically switching the display device from the first channel to the second channel, where the second video content 215 might be displayed on a main portion of the display screen 205a of the display device 205 while the first video content 210 is no longer displayed.

Figure 3A:
FIGS. 3A and 3B are schematic diagrams illustrating various embodiments of a display device that may be used for implementing auto-playing video content.
Figure 3B:

FIGS. 3A and 3B (collectively, "FIG. 3") are schematic diagrams illustrating another embodiment 300 of a display device that may be used for implementing auto-playing video content.

In the non-limiting embodiment 300 of FIG. 3, display device 305 might comprise display screen 305a, or the like. In a first instance, as shown in FIG. 3A, the display device 305 might be in an off-state. Based on a determination that the display device is in the off-state and based on a determination that a first video content 310 will be broadcast within the predetermined period, a computing system might automatically switch the display device 305 to an on-state, and might automatically set the display device 305 to display the first video content 310 being broadcast from a first content source, as shown in FIG. 3B.

The display device 305 and the first video content 310 of FIG. 3 are similar, if not identical, to the display device 205 and the second video content 215 of FIG. 2, respectively, and the descriptions of these components of embodiment 200 are applicable to the corresponding components of embodiment 300, respectively.

Figure 4:
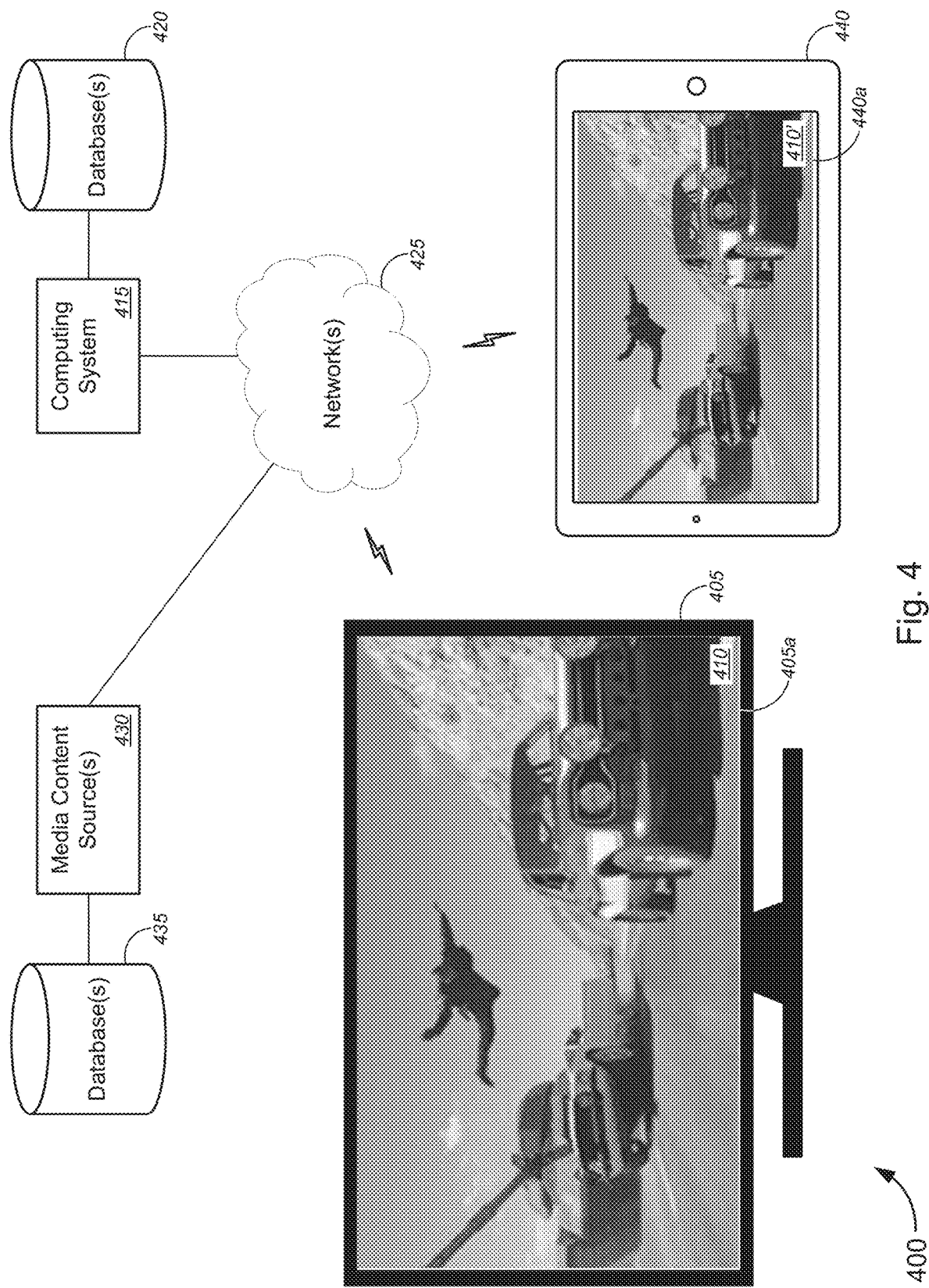
FIG. 4 is a schematic diagram illustrating a system for implementing auto-switching and/or auto-playing video content, in accordance with various embodiments.

FIG. 4 is a schematic diagram illustrating a system 400 for implementing auto-switching and/or auto-playing video content, in accordance with various embodiments.

In the non-limiting embodiment of FIG. 4, system 400 might comprise a display device 405 having a display screen 405a, on which is displayed first video content 410. System 400 might further comprise computing system 415 and corresponding database(s) 420, one or more networks 425, one or more media content sources 430 and corresponding database(s) 435, and user device 440 having a display screen 440a.

In a first instance, the computing system 415 might retrieve the first video content 410 from at least one of the one or more media content sources 430 (and corresponding database(s) 435), via network(s) 425, and might send, via network(s) 425 (either wirelessly (as depicted in FIG. 4 by lightning bolt symbol, or the like) or via wired connection (not shown)), the first video content 410 for display of the first video content 410 on the display screen 405a of the display device 405.

At a first point (or first time instant) during presentation of the first video content 410 on the display screen 405a of the display device 405, the computing system 415 might determine whether a first user (not shown), who has been viewing the first video content 410 on the display device 405, has moved beyond a viewing range of the display device 405. Based on a determination that the first user has moved beyond the viewing range of the display device 405, the computing system might determine whether the first user is within viewing range of the display screen 405a of the user device 405. Based on a determination that the first user is within viewing range of the display screen 405a of the user device 405, the computing system might send a first command instruction to the user device 440 (either wirelessly (as depicted in FIG. 4 by lightning bolt symbol, or the like) or via wired connection (not shown)) to begin displaying the first video content 410' continuing from the first point (or first time instant), and might send a second command instruction to the display device 405 to discontinue displaying the first video content 410 on the display screen 405a of the display device 405. Each of the first command instruction and the second command instruction might be sent by the computing system without any user interaction by any user with any of the computing system, the display device, or the user device to initiate sending of each of the first command instruction and the second command instruction.

In some embodiments, the computing system 415 (in some cases, in coordination with the display device 405 and the user device 440) might take into account delays in sending the command signals, sending the video signals, and the display device 405 and the user device 440 displaying the video signals, and might control the display of the first video content 410' on display screen 440a of the user device 440 without apparent delay to the user between the switch from display of the first video content 410 on the display device 405 to display of the first video content 410' on the display device 440.

According to some embodiments, the first video content 410 or 410' might include, without limitation, at least one of a movie, a television show, a documentary, a comedy, a drama, a science fiction show, a fantasy show, a non-fictional show, a sports telecast, a news show, a travel show, a home improvement show, or a cooking show, and/or the like. In some cases, the computing system 415 might include, but are not limited to, one of an EPG system, a set-top box ("STB"), a Blu-ray disc ("BD") player, a digital video recording ("DVR") device, a processor of the display device running a software application ("app"), a processor of a user device running an app, a server computer over a network, a cloud-based computing system over a network, a media player, a streaming media player, or a gaming console, and/or the like. In the non-limiting embodiment of FIG. 4, the display device 405 is depicted as a television or computer monitor, while the user device 440 is depicted as a smart phone. The various embodiments are not so limited, and the display device 405 and the user device 440 might each include, without limitation, one of a television, a computer monitor, a laptop display, a tablet computer, or a smart phone, and/or the like.

In some cases, the media content source(s) 430 might each include, without limitation, one of a video streaming source, a video broadcast source, a Blu-ray disc ("BD") player, a digital video recording ("DVR") device, a video-on-demand ("VOD") content source, an off the air ("OTA") source, or a third party content source, and/or the like.

Figure 5A:
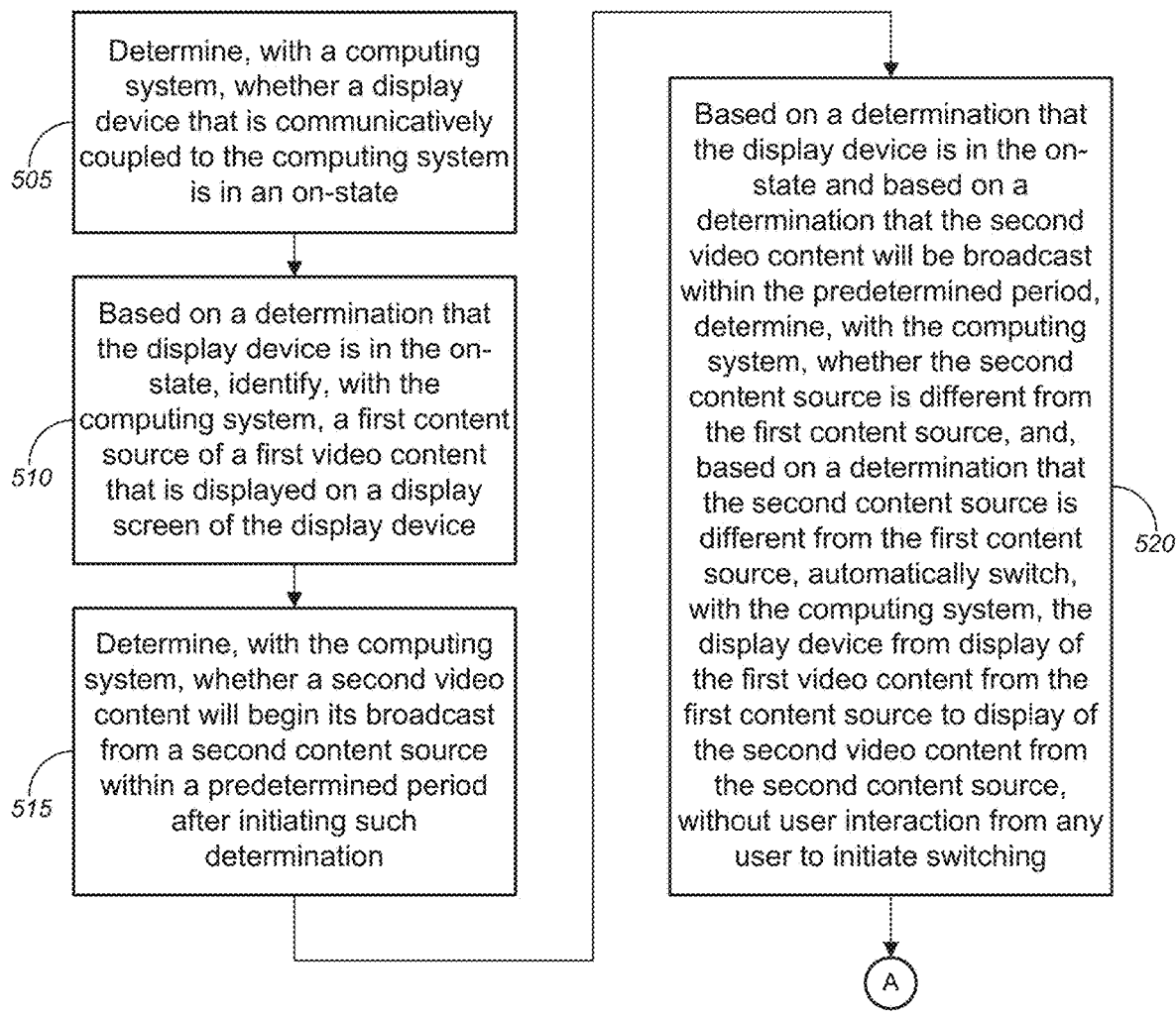
FIGS. 5A and 5B are flow diagrams illustrating a method for implementing auto-switching and/or auto-playing video content, in accordance with various embodiments.
Figure 5B:
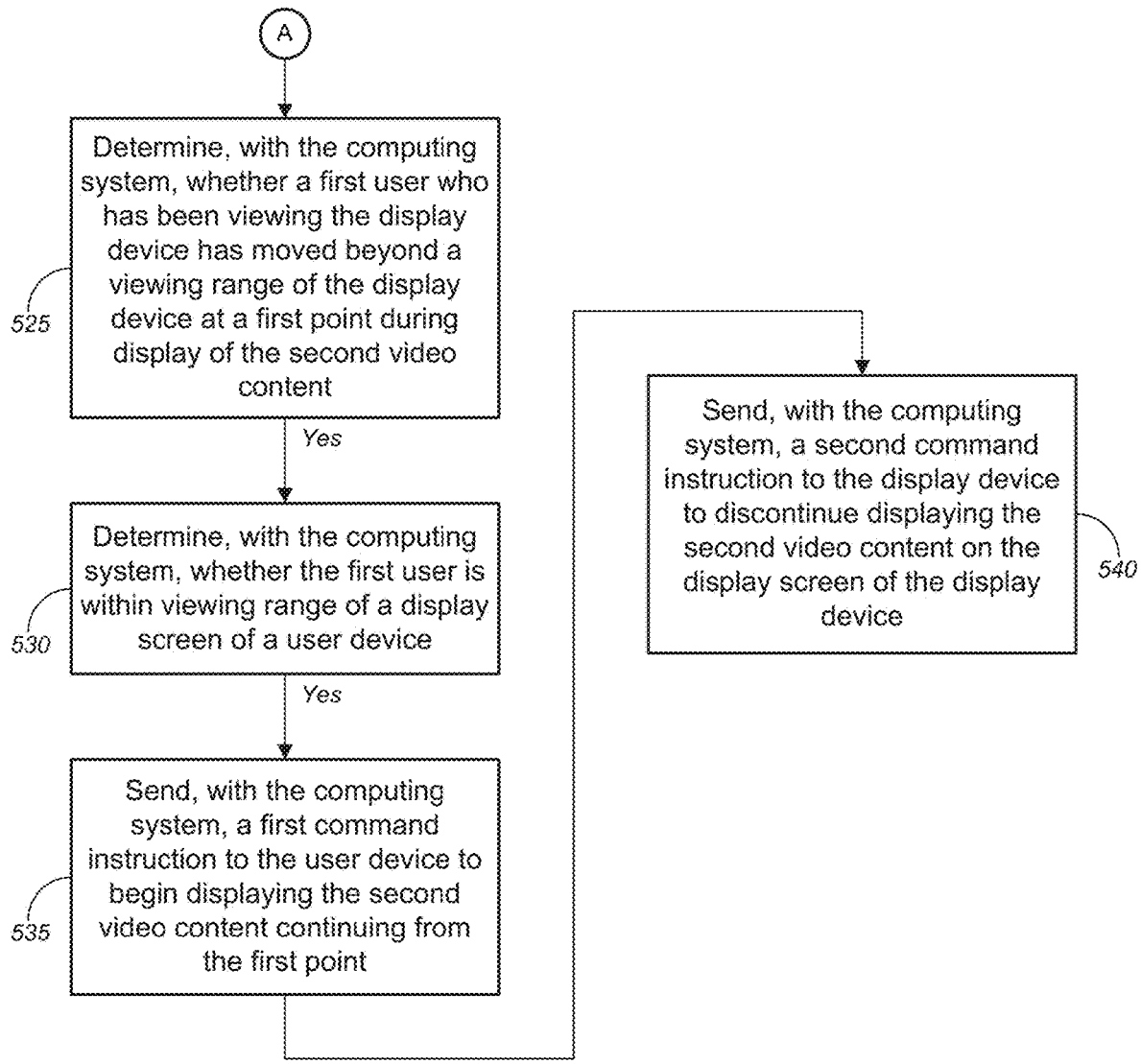

FIGS. 5A and 5B (collectively, "FIG. 5") are flow diagrams illustrating a method 500 for implementing auto-switching and/or auto-playing video content, in accordance with various embodiments. Method 500 of FIG. 5A continues onto FIG. 5B following the circular marker denoted, "A."

While the techniques and procedures are depicted and/or described in a certain order for purposes of illustration, it should be appreciated that certain procedures may be reordered and/or omitted within the scope of various embodiments. Moreover, while the method 500 illustrated by FIG. 5 can be implemented by or with (and, in some cases, are described below with respect to) the systems or embodiments 100, 200, 300, and 400 of FIGS. 1, 2, 3, and 4, respectively (or components thereof), such methods may also be implemented using any suitable hardware (or software) implementation. Similarly, while each of the systems or embodiments 100, 200, 300, and 400 of FIGS. 1, 2, 3, and 4, respectively (or components thereof), can operate according to the method 500 illustrated by FIG. 5 (e.g., by executing instructions embodied on a computer readable medium), the systems or embodiments 100, 200, 300, and 400 of FIGS. 1, 2, 3, and 4 can each also operate according to other modes of operation and/or perform other suitable procedures.

In the non-limiting embodiment of FIG. 5A, method 500, at block 505, might comprise determining, with a computing system, whether a display device that is communicatively coupled to the computing system is in an on-state. At block 510, method 500 might comprise, based on a determination that the display device is in the on-state, identifying, with the computing system, a first content source of a first video content that is displayed on a display screen of the display device. Method 500 might further comprise determining, with the computing system, whether a second video content will begin its broadcast from a second content source within a predetermined period after initiating such determination (block 515).

Method 500 might further comprise, at block 520, based on a determination that the display device is in the on-state and based on a determination that the second video content will be broadcast within the predetermined period, determining, with the computing system, whether the second content source is different from the first content source, and, based on a determination that the second content source is different from the first content source, automatically switching, with the computing system, the display device from display of the first video content from the first content source to display of the second video content from the second content source, without user interaction from any user to initiate switching.

According to some embodiments, the second video content might be displayed on a main portion of the display screen of the display device, while the first video content might be displayed in a sub-portion of the display screen. In some cases, the first content source might be a first channel and the second content source might be a second channel, where automatically switching the display device from display of the first video content to display of the second video content might comprise automatically switching the display device from the first channel to the second channel, and where the second video content might be displayed on a main portion of the display screen of the display device while the first video content might no longer be displayed.

In some cases, the predetermined period might include, but are not limited to, one of 15 minutes, 10 minutes, 5 minutes, 4 minutes, 3 minutes, 2 minutes, 1 minute, or a range of time between 1 and 15 minutes, and/or the like. In some instances, the predetermined period might be based on at least one of user profile information, user preferences, or user commands, and/or the like.

Merely by way of example, each of the first video content and the second video content might include, without limitation, at least one of a movie, a television show, a documentary, a comedy, a drama, a science fiction show, a fantasy show, a non-fictional show, a sports telecast, a news show, a travel show, a home improvement show, or a cooking show, and/or the like. In some cases, the second video content might be selected based on at least one of user profile information, user preferences, prior user commands, viewer history of a user, viewer history of a friend of the user, or association with video content that the user has previously viewed, and/or the like. In some embodiments, the computing system might include, but are not limited to, one of an EPG system, a set-top box ("STB"), a Blu-ray disc ("BD") player, a digital video recording ("DVR") device, a processor of the display device running a software application ("app"), a processor of a user device running an app, a server computer over a network, a cloud-based computing system over a network, a media player, a streaming media player, or a gaming console, and/or the like. In some instances, the display device might include, without limitation, one of a television, a computer monitor, a laptop display, a tablet computer, or a smart phone, and/or the like. In some cases, the first content source and the second content source might each include, but is not limited to, one of a video streaming source, a video broadcast source, a BD player, a DVR device, a video-on-demand ("VOD") content source, an off the air ("OTA") source, or a third party content source, and/or the like.

With reference to FIG. 5B, at block 525 (following the circular marker denoted, "A"), the method 500 might comprise determining, with the computing system, whether a first user who has been viewing the display device has moved beyond a viewing range of the display device at a first point during display of the second video content. If so, the method 500 might further comprise, at block 530, determining, with the computing system, whether the first user is within viewing range of a display screen of a user device. If so, the method 500 might further comprise sending, with the computing system, a first command instruction to the user device to begin displaying the second video content continuing from the first point (block 535) and sending, with the computing system, a second command instruction to the display device to discontinue displaying the second video content on the display screen of the display device (block 540). Each of the first command instruction and the second command instruction might be sent by the computing system without any user interaction by any user with any of the computing system, the display device, or the user device to initiate sending of each of the first command instruction and the second command instruction.

FIGS. 6A-6D (collectively, "FIG. 6") are flow diagrams illustrating another method 600 for implementing auto-switching and/or auto-playing video content, in accordance with various embodiments. Method 600 of FIG. 6A continues onto FIG. 6B following the circular marker denoted, "A."

While the techniques and procedures are depicted and/or described in a certain order for purposes of illustration, it should be appreciated that certain procedures may be reordered and/or omitted within the scope of various embodiments. Moreover, while the method 600 illustrated by FIG. 6 can be implemented by or with (and, in some cases, are described below with respect to) the systems or embodiments 100, 200, 300, and 400 of FIGS. 1, 2, 3, and 4, respectively (or components thereof), such methods may also be implemented using any suitable hardware (or software) implementation. Similarly, while each of the systems or embodiments 100, 200, 300, and 400 of FIGS. 1, 2, 3, and 4, respectively (or components thereof), can operate according to the method 600 illustrated by FIG. 6 (e.g., by executing instructions embodied on a computer readable medium), the systems or embodiments 100, 200, 300, and 400 of FIGS. 1, 2, 3, and 4 can each also operate according to other modes of operation and/or perform other suitable procedures.

Figure 6A:
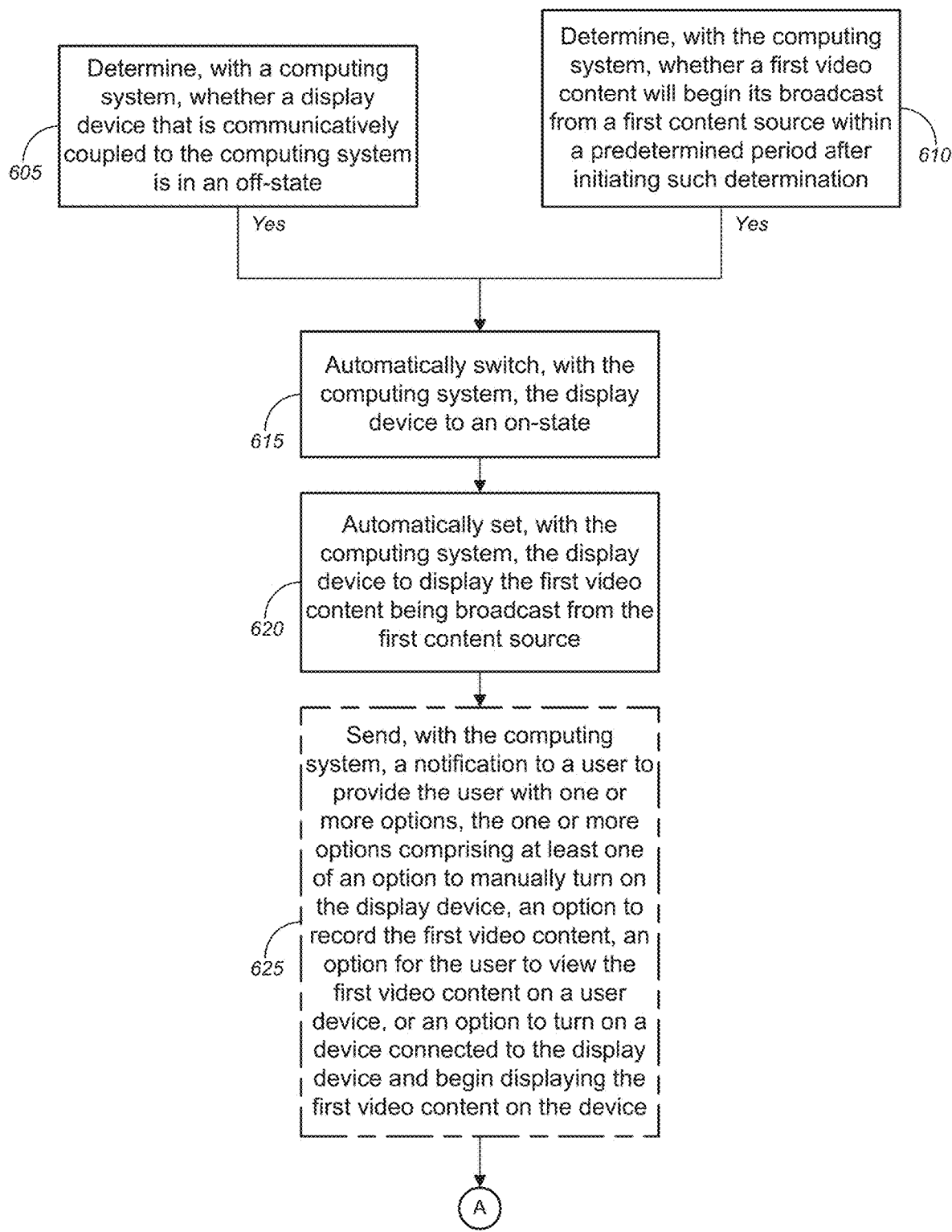
FIGS. 6A-6D are flow diagrams illustrating another method for implementing auto-switching and/or auto-playing video content, in accordance with various embodiments.

In the non-limiting embodiment of FIG. 6A, method 600 might comprise determining, with a computing system, whether a display device that is communicatively coupled to the computing system is in an off-state (block 605) and determining, with the computing system, whether a first video content will begin its broadcast from a first content source within a predetermined period after initiating such determination (block 610). Method 600 might further comprise, based on a determination that the display device is in the off-state (at block 605) and based on a determination that the first video content will be broadcast within the predetermined period (at block 610), automatically switching, with the computing system, the display device to an on-state (block 615), and automatically setting, with the computing system, the display device to display the first video content being broadcast from the first content source (block 620).

In some embodiments, the method, at optional block 625, might comprise sending, with the computing system, a notification to a user to provide the user with one or more options. In some cases, the one or more options might include, without limitation, at least one of an option to manually turn on the display device, an option to record the first video content, an option for the user to view the first video content on a user device, or an option to turn on a device connected to the display device and begin displaying the first video content on the device, and/or the like.

In some cases, the predetermined period might include, but are not limited to, one of 15 minutes, 10 minutes, 5 minutes, 4 minutes, 3 minutes, 2 minutes, 1 minute, or a range of time between 1 and 15 minutes, and/or the like. In some instances, the predetermined period might be based on at least one of user profile information, user preferences, or user commands, and/or the like.

Merely by way of example, the first video content might include, without limitation, at least one of a movie, a television show, a documentary, a comedy, a drama, a science fiction show, a fantasy show, a non-fictional show, a sports telecast, a news show, a travel show, a home improvement show, or a cooking show, and/or the like. In some cases, the first video content might be selected based at least in part on at least one of user profile information, user preferences, prior user commands, viewer history of a user, viewer history of a friend of the user, association with video content that the user has previously viewed, viewing preferences of pets, viewing history of pets, or viewing profile of pets, and/or the like. In some embodiments, the computing system might include, but are not limited to, one of an EPG system, a set-top box ("STB"), a Blu-ray disc ("BD") player, a digital video recording ("DVR") device, a processor of the display device running a software application ("app"), a processor of a user device running an app, a server computer over a network, a cloud-based computing system over a network, a media player, a streaming media player, or a gaming console, and/or the like. In some instances, the display device might include, without limitation, one of a television, a computer monitor, a laptop display, a tablet computer, or a smart phone, and/or the like. In some cases, the first content source might include, but is not limited to, one of a video streaming source, a video broadcast source, a BD player, a DVR device, a video-on-demand ("VOD") content source, an off the air ("OTA") source, or a third party content source, and/or the like.

Figure 6B:
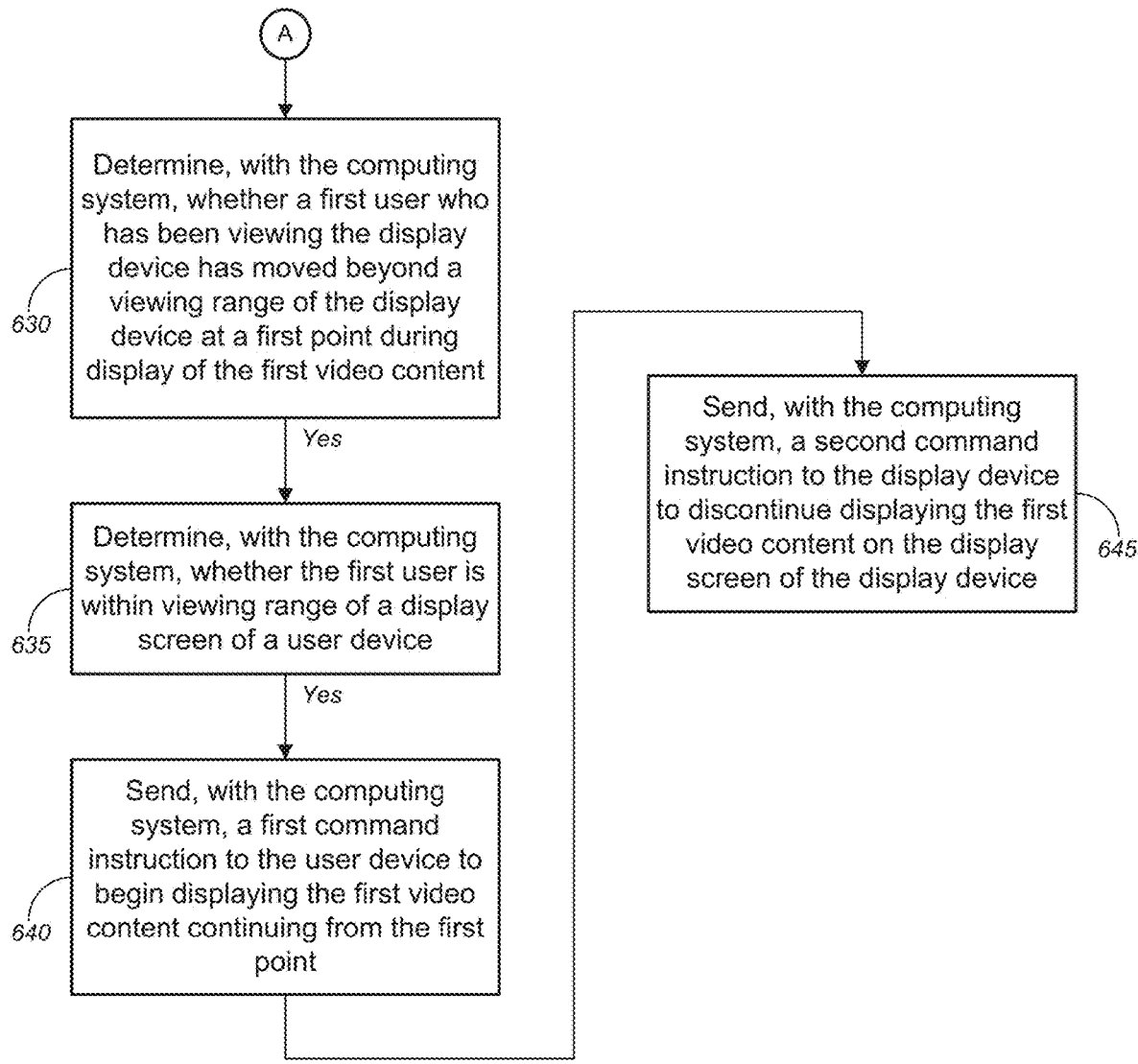

With reference to FIG. 6B, at block 630 (following the circular marker denoted, "A"), the method 600 might comprise determining, with the computing system, whether a first user who has been viewing the display device has moved beyond a viewing range of the display device at a first point during display of the second video content. If so, the method 600 might further comprise, at block 635, determining, with the computing system, whether the first user is within viewing range of a display screen of a user device. If so, the method 600 might further comprise sending, with the computing system, a first command instruction to the user device to begin displaying the second video content continuing from the first point (block 640) and sending, with the computing system, a second command instruction to the display device to discontinue displaying the second video content on the display screen of the display device (block 645). Each of the first command instruction and the second command instruction might be sent by the computing system without any user interaction by any user with any of the computing system, the display device, or the user device to initiate sending of each of the first command instruction and the second command instruction.

Figure 6C:
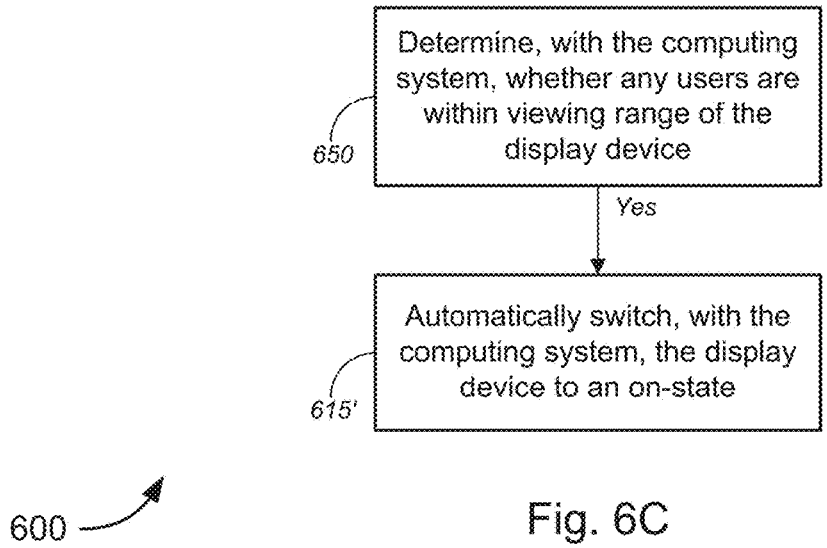

Turning to FIG. 6C, method 600 might further comprise determining, with the computing system, whether any users are within viewing range of the display device (block 650). Based on a determination that at least one user is within viewing range of the display device, method 600 might comprise, at block 615', automatically switching, with the computing system, the display device to the on-state.

Figure 6D:
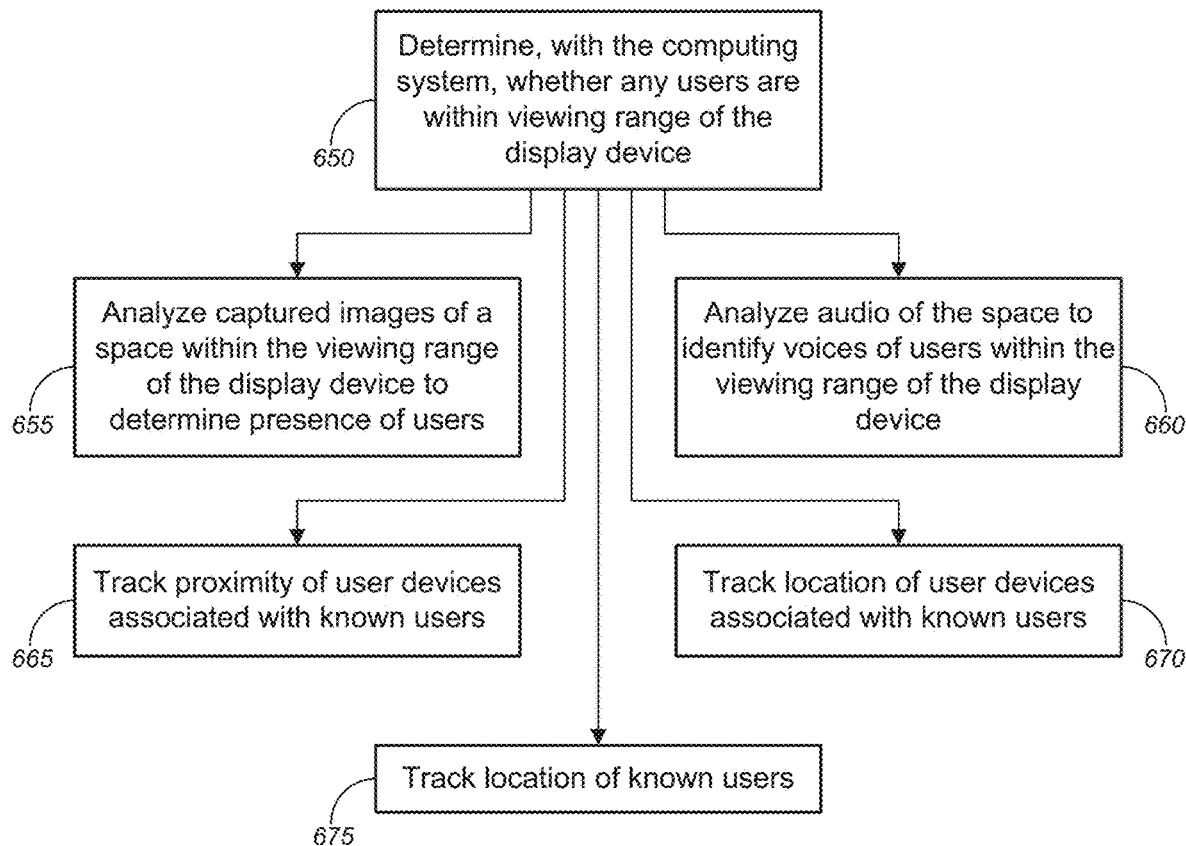

Referring to FIG. 6D, determining, with the computing system, whether any users are within viewing range of the display device (at block 650) might comprise at least one of analyzing captured images of a space within the viewing range of the display device to determine presence of users (block 655), analyzing audio of the space to identify voices of users within the viewing range of the display device (block 660), tracking proximity of user devices associated with known users (block 665), tracking location of user devices associated with known users (block 670), or tracking location of known users (block 675), and/or the like.

In some embodiments, at least one of automatically switching the display device to the on-state or automatically setting the display device to display the first video content being broadcast from the first content source might comprise utilizing consumer electronics control ("CEC") functionality of high-definition multimedia interface ("HDMI") protocols, or the like. According to some embodiments, automatically switching the display device to the on-state and automatically setting the display device to display the first video content being broadcast from the first content source might be initiated based on at least one of vacation mode settings by a user, vacation mode instructions by the user, vacation mode profiles for the user, and/or the like.

Exemplary System and Hardware Implementation

Figure 7:
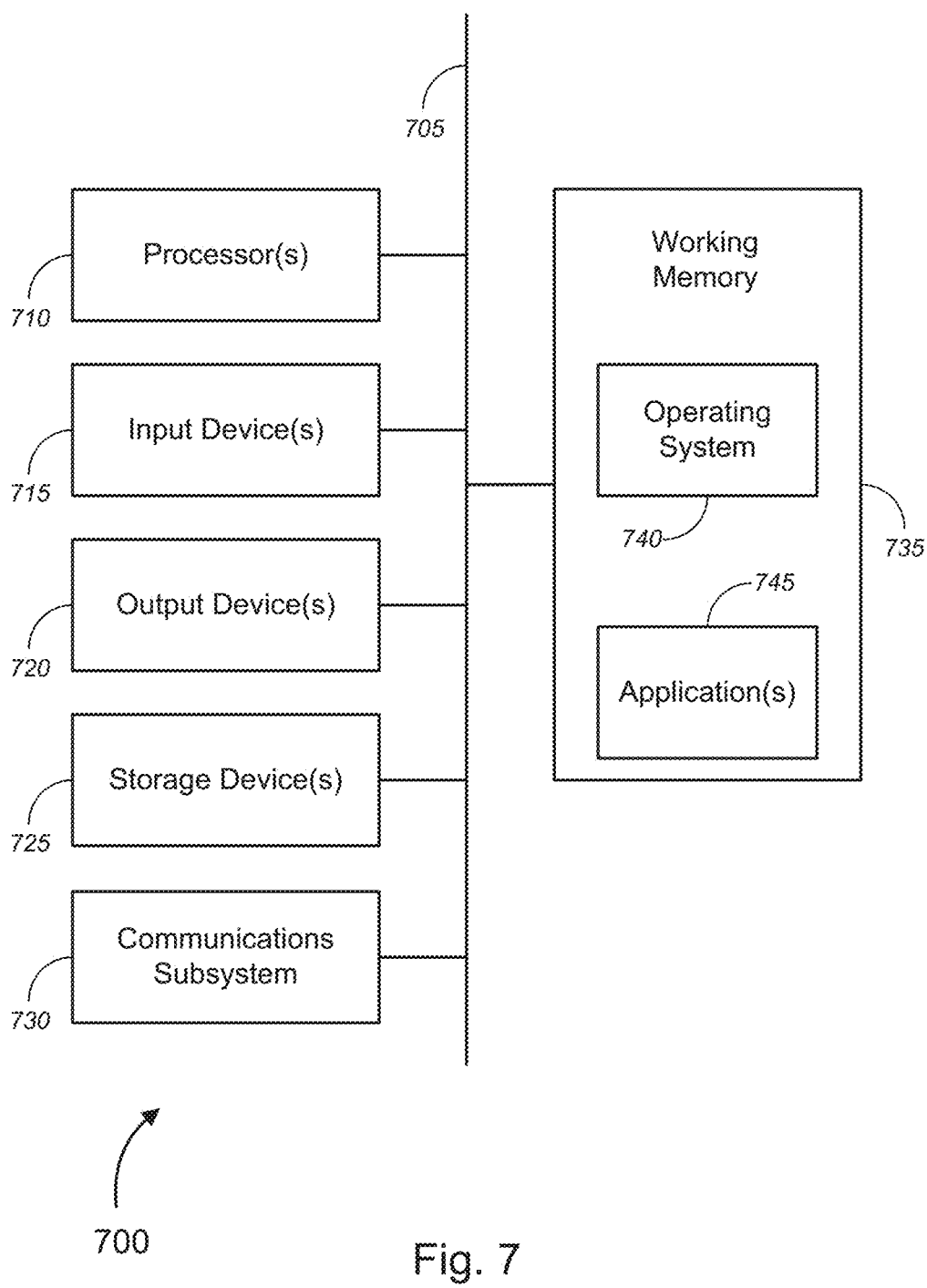
FIG. 7 is a block diagram illustrating an exemplary computer or system hardware architecture, in accordance with various embodiments.

FIG. 7 is a block diagram illustrating an exemplary computer or system hardware architecture, in accordance with various embodiments. FIG. 7 provides a schematic illustration of one embodiment of a computer system 700 of the service provider system hardware that can perform the methods provided by various other embodiments, as described herein, and/or can perform the functions of computer or hardware system (i.e., computing systems 105*a*, 105*b*, and 415, (main) display devices 115, 205, 305, and 405, user devices 120 and 440, audio playback devices 125*a*-125*n*, media content sources (or servers) 135 and 430, etc.), as described above. It should be noted that FIG. 7 is meant only to provide a generalized illustration of various components, of which one or more (or none) of each may be utilized as appropriate. FIG. 7, therefore, broadly illustrates how individual system elements may be implemented in a relatively separated or relatively more integrated manner.

The computer or hardware system 700—which might represent an embodiment of the computer or hardware system (i.e., computing systems 105*a*, 105*b*, and 415, (main) display devices 115, 205, 305, and 405, user devices 120 and 440, audio playback devices 125*a*-125*n*, media content sources (or servers) 135 and 430, etc.), described above with respect to FIGS. 1-6—is shown comprising hardware elements that can be electrically coupled via a bus 705 (or may otherwise be in communication, as appropriate). The hardware elements may include one or more processors 710, including, without limitation, one or more general-purpose processors and/or one or more special-purpose processors (such as microprocessors, digital signal processing chips, graphics acceleration processors, and/or the like); one or more input devices 715, which can include, without limitation, a mouse, a keyboard, and/or the like; and one or more output devices 720, which can include, without limitation, a display device, a printer, and/or the like.

The computer or hardware system 700 may further include (and/or be in communication with) one or more storage devices 725, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 700 might also include a communications subsystem 730, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 730 may permit data to be exchanged with a network (such as the network described below, to name one example), with other computer or hardware systems, and/or with any other devices described herein. In many embodiments, the computer or hardware system 700 will further comprise a working memory 735, which can include a RAM or ROM device, as described above.

The computer or hardware system 700 also may comprise software elements, shown as being currently located within the working memory 735, including an operating system 740, device drivers, executable libraries, and/or other code, such as one or more application programs 745, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 725 described above. In some cases, the storage medium might be incorporated within a computer system, such as the system 700. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 700 and/or might take the form of source and/or installable code, which, upon compilation and/or installation on the computer or hardware system 700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 700) to perform methods in accordance with various embodiments of the invention. According to a set of embodiments, some or all of the procedures of such methods are performed by the computer or hardware system 700 in response to processor 710 executing one or more sequences of one or more instructions (which might be incorporated into the operating system 740 and/or other code, such as an application program 745) contained in the working memory 735. Such instructions may be read into the working memory 735 from another computer readable medium, such as one or more of the storage device(s) 725. Merely by way of example, execution of the sequences of instructions contained in the working memory 735 might cause the processor(s) 710 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 700, various computer readable media might be involved in providing instructions/code to processor(s) 710 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 725. Volatile media includes, without limitation, dynamic memory, such as the working memory 735. In some alternative embodiments, a computer readable medium may take the form of transmission media, which includes, without limitation, coaxial cables, copper wire, and fiber optics, including the wires that comprise the bus 705, as well as the various components of the communication subsystem 730 (and/or the media by which the communications subsystem 730 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 700. These signals, which might be in the form of electromagnetic signals, acoustic signals, optical signals, and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a storage device 725 either before or after execution by the processor(s) 710.

Figure 8:
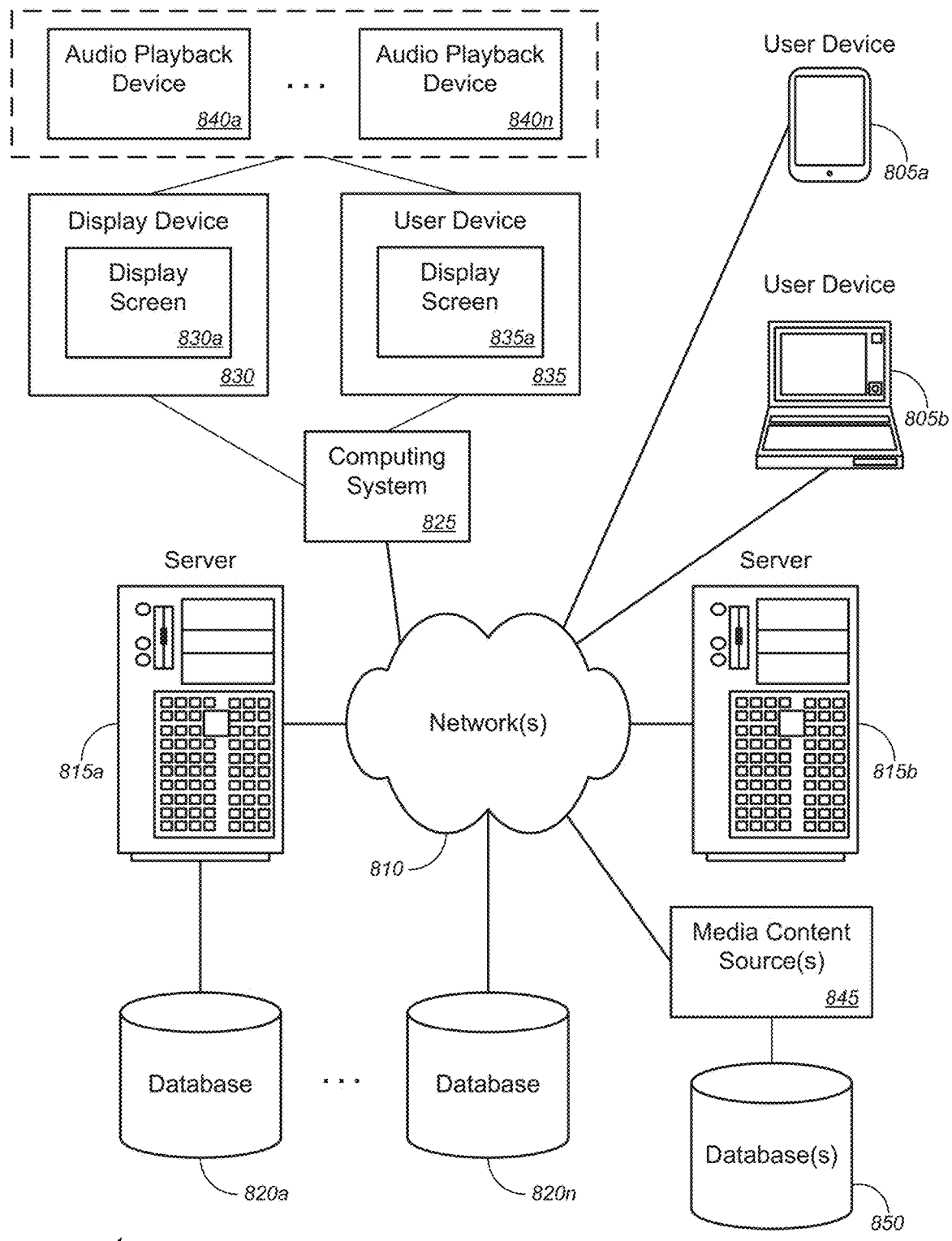
FIG. 8 is a block diagram illustrating a networked system of computers, computing systems, or system hardware architecture, which can be used in accordance with various embodiments.

As noted above, a set of embodiments comprises methods and systems for implementation media content presentation, and, more particularly, to methods, systems, and apparatuses for implementing auto-switching and/or auto-playing video content. FIG. 8 illustrates a schematic diagram of a system 800 that can be used in accordance with one set of embodiments. The system 800 can include one or more user computers, user devices, or customer devices 805. A user computer, user device, or customer device 805 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 805 can also have any of a variety of applications, including one or more applications configured to perform methods provided by various embodiments (as described above, for example), as well as one or more office applications, database client and/or server applications, and/or web browser applications. Alternatively, a user computer, user device, or customer device 805 can be any other electronic device, such as a thin-client computer, Internet-enabled mobile telephone, and/or personal digital assistant, capable of communicating via a network (e.g., the network(s) 810 described below) and/or of displaying and navigating web pages or other types of electronic documents. Although the exemplary system 800 is shown with two user computers, user devices, or customer devices 805, any number of user computers, user devices, or customer devices can be supported.

Certain embodiments operate in a networked environment, which can include a network(s) 810. The network(s) 810 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 810 (similar to network(s) 145 and 425 of FIGS. 1 and 4, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 815. Each of the server computers 815 may be configured with an operating system, including, without limitation, any of those discussed above, as well as any commercially (or freely) available server operating systems. Each of the servers 815 may also be running one or more applications, which can be configured to provide services to one or more clients 805 and/or other servers 815.

Merely by way of example, one of the servers 815 might be a data server, a web server, a cloud computing device(s), or the like, as described above. The data server might include (or be in communication with) a web server, which can be used, merely by way of example, to process requests for web pages or other electronic documents from user computers 805. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 805 to perform methods of the invention.

The server computers 815, in some embodiments, might include one or more application servers, which can be configured with one or more applications accessible by a client running on one or more of the client computers 805 and/or other servers 815. Merely by way of example, the server(s) 815 can be one or more general purpose computers capable of executing programs or scripts in response to the user computers 805 and/or other servers 815, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 805 and/or another server 815. In some embodiments, an application server can perform one or more of the processes for implementation media content presentation, and, more particularly, to methods, systems, and apparatuses for implementing auto-switching and/or auto-playing video content, as described in detail above. Data provided by an application server may be formatted as one or more web pages (comprising HTML, JavaScript, etc., for example) and/or may be forwarded to a user computer 805 via a web server (as described above, for example). Similarly, a web server might receive web page requests and/or input data from a user computer 805 and/or forward the web page requests and/or input data to an application server. In some cases, a web server may be integrated with an application server.

In accordance with further embodiments, one or more servers 815 can function as a file server and/or can include one or more of the files (e.g., application code, data files, etc.) necessary to implement various disclosed methods, incorporated by an application running on a user computer 805 and/or another server 815. Alternatively, as those skilled in the art will appreciate, a file server can include all necessary files, allowing such an application to be invoked remotely by a user computer, user device, or customer device 805 and/or server 815.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 820a-820n (collectively, "databases 820"). The location of each of the databases 820 is discretionary: merely by way of example, a database 820a might reside on a storage medium local to (and/or resident in) a server 815a (and/or a user computer, user device, or customer device 805). Alternatively, a database 820n can be remote from any or all of the computers 805, 815, so long as it can be in communication (e.g., via the network 810) with one or more of these. In a particular set of embodiments, a database 820 can reside in a storage-area network ("SAN") familiar to those skilled in the art. (Likewise, any necessary files for performing the functions attributed to the computers 805, 815 can be stored locally on the respective computer and/or remotely, as appropriate.) In one set of embodiments, the database 820 can be a relational database, such as an Oracle database, that is adapted to store, update, and retrieve data in response to SQL-formatted commands. The database might be controlled and/or maintained by a database server, as described above, for example.

According to some embodiments, system 800 might further comprise a computing system 825 (similar to computing systems 105a, 105b, and 415 of FIGS. 1 and 4, or the like), one or more (main) display devices 830 each with display screen 830a (similar to display devices 115, 205, 305, and 405 of FIGS. 1-4, or the like), one or more user devices 835 each with display screen 835a (similar to user devices 120 and 440 of FIGS. 1 and 4, or the like), one or more audio playback devices 840a-840n (similar to audio playback devices 125a-125n of FIG. 1, or the like), one or more media (e.g., video) content sources 845 and corresponding database(s) 850 (similar to media or video content sources (or servers) 135 and corresponding databases 140 of FIG. 1, or the like), and/or the like. In some embodiments, the computing system might comprise a media device that is communicatively coupled to a playback device(s) (i.e., one or more of display device(s) 115 or 830, the user device(s) 120 or 835, and/or audio playback device(s) 125a-125n or 840a-840n, or the like). In some cases, the media device might comprise one of a set-top box ("STB"), a media player, a streaming media player, a gaming console, a server computer, a desktop computer, or a laptop computer, and/or the like. The media player might comprise one of a digital versatile disc or digital video disc ("DVD") player, a Blu-ray disc ("BD") player, a streaming video player, a streaming music player, or a streaming game player, and/or the like, while the playback device might comprise at least one of one or more monitors, one or more television sets, or one or more speakers, and/or the like.

In operation, the computing system 825 might determine whether a display device that is communicatively coupled to the computing system is in an on-state; based on a determination that the display device is in the on-state, identify a first content source of a first video content that is displayed on a display screen of the display device; determine whether a second video content will begin its broadcast from a second content source within a predetermined period after initiating such determination; and based on a determination that the display device is in the on-state and based on a determination that the second video content will be broadcast within the predetermined period, determine whether the second content source is different from the first content source, and, based on a determination that the second content source is different from the first content source, automatically switch the display device from display of the first video content from the first content source to display of the second video content from the second content source, without user interaction from any user to initiate switching.

In some embodiments, the second video content might be displayed on a main portion of the display screen of the display device, while the first video content might be displayed in a sub-portion of the display screen. Alternatively, the first content source might be a first channel and the second content source might be a second channel, where automatically switching the display device from display of the first video content to display of the second video content might comprise automatically switching the display device from the first channel to the second channel, where the second video content might be displayed on a main portion of the display screen of the display device while the first video content might no longer be displayed.

In some cases, the predetermined period might comprise one of 15 minutes, 10 minutes, 5 minutes, 4 minutes, 3 minutes, 2 minutes, 1 minute, or a range of time between 1 and 15 minutes, and/or the like. In some instances, the predetermined period might be based on at least one of user profile information, user preferences, or user commands, and/or the like. According to some embodiments, each of the first video content and the second video content might comprise at least one of a movie, a television show, a documentary, a comedy, a drama, a science fiction show, a fantasy show, a non-fictional show, a sports telecast, a news show, a travel show, a home improvement show, or a cooking show, and/or the like. In some cases, the second video content might be selected based at least in part on at least one of user profile information, user preferences, prior user commands, viewer history of a user, viewer history of a friend of the user, or association with video content that the user has previously viewed, and/or the like.

According to some embodiments, the computing system might comprise one of an EPG system, a STB, a BD player, a digital video recording ("DVR") device, a processor of the display device running a software application ("app"), a processor of a user device running an app, a server computer over a network, a cloud-based computing system over a network, a media player, a streaming media player, or a gaming console, and/or the like. In some instances, the display device might comprise one of a television, a computer monitor, a laptop display, a tablet computer, or a smart phone, and/or the like. In some cases, the first content source and the second content source might each comprise one of a video streaming source, a video broadcast source, a BD player, a DVR device, a video-on-demand ("VOD") content source, an off the air ("OTA") source, or a third party content source, and/or the like.

In alternative embodiments, the computing system 825 might determine whether a display device that is communicatively coupled to the computing system is in an off-state; determine whether a first video content will begin its broadcast from a first content source within a predetermined period after initiating such determination; and based on a determination that the display device is in the off-state and based on a determination that the first video content will be broadcast within the predetermined period, automatically switch the display device to an on-state, and automatically set the display device to display the first video content being broadcast from the first content source.

In some embodiments, the computing system 825 might determine whether any users are within viewing range of the display device, where automatically switching the display device to the on-state might be based on a determination that at least one user is within viewing range of the display device. In some cases, determining whether any users are within viewing range of the display device might comprise at least one of analyzing captured images of a space within the viewing range of the display device to determine presence of users, analyzing audio of the space to identify voices of users within the viewing range of the display device, tracking proximity of user devices associated with known users, tracking location of user devices associated with known users, or tracking location of known users, and/or the like. In some instances, at least one of automatically switching the display device to the on-state or automatically setting the display device to display the first video content being broadcast from the first content source might comprise utilizing consumer electronics control ("CEC") functionality of high-definition multimedia interface ("HDMI") protocols, or the like. According to some embodiments, automatically switching the display device to the on-state and automatically setting the display device to display the first video content being broadcast from the first content source might be initiated based on at least one of vacation mode settings by a user, vacation mode instructions by the user, vacation mode profiles for the user, and/or the like.

In some instances, the computing system 825 might send a notification to a user to provide the user with one or more options, the one or more options comprising at least one of an option to manually turn on the display device, an option to record the first video content, an option for the user to view the first video content on a user device, or an option to turn on a device connected to the display device and begin displaying the first video content on the device, and/or the like.

In some cases, the predetermined period might comprise one of 15 minutes, 10 minutes, 5 minutes, 4 minutes, 3 minutes, 2 minutes, 1 minute, or a range of time between 1 and 15 minutes, and/or the like. In some instances, the predetermined period might be based on at least one of user profile information, user preferences, or user commands, and/or the like. According to some embodiments, each of the first video content and the second video content might comprise at least one of a movie, a television show, a documentary, a comedy, a drama, a science fiction show, a fantasy show, a non-fictional show, a sports telecast, a news show, a travel show, a home improvement show, or a cooking show, and/or the like. In some cases, the second video content might be selected based at least in part on at least one of user profile information, user preferences, prior user commands, viewer history of a user, viewer history of a friend of the user, or association with video content that the user has previously viewed, and/or the like.

According to some embodiments, the computing system might comprise one of an EPG system, a STB, a BD player, a DVR device, a processor of the display device running a software application ("app"), a processor of a user device running an app, a server computer over a network, a cloud-based computing system over a network, a media player, a streaming media player, or a gaming console, and/or the like. In some instances, the display device might comprise one of a television, a computer monitor, a laptop display, a tablet computer, or a smart phone, and/or the like. In some cases, the first content source and the second content source might each comprise one of a video streaming source, a video broadcast source, a BD player, a DVR device, a VOD content source, an OTA source, or a third party content source, and/or the like.

These and other functions of the system 800 (and its components) are described in greater detail above with respect to FIGS. 1-6.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:
1. A method, comprising:
  determining, with a computing system, whether a display device that is communicatively coupled to the computing system is in an off-state;
  determining, with the computing system, whether a first video content will begin its broadcast from a first content source within a predetermined period after initiating such determination;

based on a determination that the display device is in the off-state and based on a determination that the first video content will be broadcast within the predetermined period, automatically switching, with the computing system, the display device to an on-state, and automatically setting, with the computing system, the display device to display the first video content being broadcast from the first content source;

determining, with the computing system, whether a first user who has been viewing the display device has moved beyond a viewing range of the display device at a first point during display of the first video content;

based on a determination that the first user has moved beyond the viewing range of the display device, determining, with the computing system, whether the first user is within viewing range of a display screen of a user device; and based on a determination that the first user is within viewing range of a display screen of a user device, sending, with the computing system, a first command instruction to the user device to begin displaying the first video content continuing from the first point; sending, with the computing system, a second command instruction to the display device to discontinue displaying the first video content on the display screen of the display device; wherein each of the first command instruction and the second command instruction are sent by the computing system without any user interaction by any user with any of the computing system, the display device, or the user device to initiate sending of each of the first command instruction and the second command instruction.

2. The method of claim 1, further comprising:
determining, with the computing system, whether any users are within viewing range of the display device;
wherein automatically switching the display device to the on-state is based on a determination that at least one user is within viewing range of the display device.

3. The method of claim 2, wherein determining whether any users are within viewing range of the display device comprises at least one of analyzing captured images of a space within the viewing range of the display device to determine presence of users, analyzing audio of the space to identify voices of users within the viewing range of the display device, tracking proximity of user devices associated with known users, tracking location of user devices associated with known users, or tracking location of known users.

4. The method of claim 1, wherein at least one of automatically switching the display device to the on-state or automatically setting the display device to display the first video content being broadcast from the first content source comprises utilizing consumer electronics control ("CEC") functionality of high-definition multimedia interface ("HDMI") protocols.

5. The method of claim 1, wherein automatically switching the display device to the on-state and automatically setting the display device to display the first video content being broadcast from the first content source are initiated based on at least one of vacation mode settings by a user, vacation mode instructions by the user, or vacation mode profiles for the user.

6. The method of claim 1, further comprising:
sending, with the computing system, a notification to a user to provide the user with one or more options, the one or more options comprising at least one of an option to manually turn on the display device, an option to record the first video content, an option for the user to view the first video content on a user device, or an option to turn on a device connected to the display device and begin displaying the first video content on the device.

7. The method of claim 1, wherein the predetermined period comprises one of 15 minutes, 10 minutes, 5 minutes, 4 minutes, 3 minutes, 2 minutes, 1 minute, or a range of time between 1 and 15 minutes.

8. The method of claim 7, wherein the predetermined period is based on at least one of user profile information, user preferences, or user commands.

9. The method of claim 1, wherein the first video content comprises at least one of a movie, a television show, a documentary, a comedy, a drama, a science fiction show, a fantasy show, a non-fictional show, a sports telecast, a news show, a travel show, a home improvement show, or a cooking show.

10. The method of claim 9, wherein the first video content is selected based at least in part on at least one of user profile information, user preferences, prior user commands, viewer history of a user, viewer history of a friend of the user, association with video content that the user has previously viewed, viewing preferences of pets, viewing history of pets, or viewing profile of pets.

11. The method of claim 1, wherein the computing system comprises one of an electronic programming guide ("EPG") system, a set-top box ("STB"), a Blu-ray disc ("BD") player, a digital video recording ("DVR") device, a processor of the display device running a software application ("app"), a processor of a user device running an app, a server computer over a network, a cloud-based computing system over a network, a media player, a streaming media player, or a gaming console.

12. The method of claim 1, wherein the display device comprises one of a television, a computer monitor, a laptop display, a tablet computer, or a smart phone.

13. The method of claim 1, wherein the first content source comprises one of a video streaming source, a video broadcast source, a Blu-ray disc ("BD") player, a digital video recording ("DVR") device, a video-on-demand ("VOD") content source, an off the air ("OTA") source, or a third party content source.

14. An apparatus, comprising:
at least one processor; and
a non-transitory computer readable medium communicatively coupled to the at least one processor, the non-transitory computer readable medium having stored thereon computer software comprising a set of instructions that, when executed by the at least one processor, causes the apparatus to:
determine whether a display device that is communicatively coupled to the computing system is in an off-state;
determine whether a first video content will begin its broadcast from a first content source within a predetermined period after initiating such determination;
based on a determination that the display device is in the off-state and based on a determination that the first video content will be broadcast within the predetermined period, automatically switch the display device to an on-state, and automatically set the display device to display the first video content being broadcast from the first content source;

determine whether a first user who has been viewing the display device has moved beyond a viewing range of the display device at a first point during display of the first video content;

based on a determination that the first user has moved beyond the viewing range of the display device, determine whether the first user is within viewing range of a display screen of a user device; and based on a determination that the first user is within viewing range of a display screen of a user device, send a first command instruction to the user device to begin displaying the first video content continuing from the first point; send a second command instruction to the display device to discontinue displaying the first video content on the display screen of the display device; wherein each of the first command instruction and the second command instruction are sent by the computing system without any user interaction by any user with any of the computing system, the display device, or the user device to initiate sending of each of the first command instruction and the second command instruction.

15. The apparatus of claim 14, wherein each of the first video content comprises at least one of a movie, a television show, a documentary, a comedy, a drama, a science fiction show, a fantasy show, a non-fictional show, a sports telecast, a news show, a travel show, a home improvement show, or a cooking show.

16. The apparatus of claim 15, wherein the first video content is selected based at least in part on at least one of user profile information, user preferences, prior user commands, viewer history of a user, viewer history of a friend of the user, association with video content that the user has previously viewed, viewing preferences of pets, viewing history of pets, or viewing profile of pets.

17. The apparatus of claim 14, wherein the apparatus comprises one of an electronic programming guide ("EPG") system, a set-top box ("STB"), a Blu-ray disc ("BD") player, a digital video recording ("DVR") device, a processor of the display device running a software application ("app"), a processor of a user device running an app, a server computer over a network, a cloud-based computing system over a network, a media player, a streaming media player, or a gaming console.

18. The apparatus of claim 14, wherein the display device comprises one of a television, a computer monitor, a laptop display, a tablet computer, or a smart phone.

19. A system, comprising:
a computing system, comprising:
at least one first processor; and
a first non-transitory computer readable medium communicatively coupled to the at least one first processor, the first non-transitory computer readable medium having stored thereon computer software comprising a first set of instructions that, when executed by the at least one first processor, causes the computing system to:
determine whether a display device that is communicatively coupled to the computing system is in an off-state;
determine whether a first video content will begin its broadcast from a first content source within a predetermined period after initiating such determination;
based on a determination that the display device is in the off-state and based on a determination that the first video content will be broadcast within the predetermined period, automatically switch the display device to an on-state, and automatically set the display device to display the first video content being broadcast from the first content source, by sending command instructions to the display device to switch the display device to an on-state and to set the display device to display the first video content, without user interaction from any user to initiate switching;
determine whether a first user who has been viewing the display device has moved beyond a viewing range of the display device at a first point during display of the first video content;
based on a determination that the first user has moved beyond the viewing range of the display device, determine whether the first user is within viewing range of a display screen of a user device; and
based on a determination that the first user is within viewing range of a display screen of a user device, send a first command instruction to the user device to begin displaying the first video content continuing from the first point; send a second command instruction to the display device to discontinue displaying the first video content on the display screen of the display device; wherein each of the first command instruction and the second command instruction are sent by the computing system without any user interaction by any user with any of the computing system, the display device, or the user device to initiate sending of each of the first command instruction and the second command instruction; and the display device, comprising:
a display screen;
at least one second processor; and
a second non-transitory computer readable medium communicatively coupled to the at least one second processor, the second non-transitory computer readable medium having stored thereon computer software comprising a second set of instructions that, when executed by the at least one second processor, causes the display device to:
receive the command instructions from the computing system to switch the display device to an on-state and to set the display device to display the first video content;
power on the display device; and
display the first video content on the display screen.

* * * * *